United States Patent
Fayolle et al.

(10) Patent No.: US 11,460,414 B2
(45) Date of Patent: Oct. 4, 2022

(54) PROCESS, DEVICE AND LINE OF INSPECTION FOR DETERMINATION OF A WIRE-EDGE AT THE SITE OF AN INTERNAL EDGE OF A RING SURFACE

(71) Applicant: TIAMA, Vourles (FR)

(72) Inventors: Lubin Fayolle, Brignais (FR); Marc Leconte, Loire sur Rhone (FR); Michel Ollivier, Acigne (FR)

(73) Assignee: TIAMA, Vourles (FR)

( * ) Notice: Subject to any disclaimer, the term of this patent is extended or adjusted under 35 U.S.C. 154(b) by 0 days.

(21) Appl. No.: 17/078,253

(22) Filed: Oct. 23, 2020

(65) Prior Publication Data

US 2021/0041374 A1 Feb. 11, 2021

Related U.S. Application Data

(62) Division of application No. 16/314,687, filed as application No. PCT/FR2017/051808 on Jul. 3, 2017, now Pat. No. 10,859,509.

(30) Foreign Application Priority Data

Jul. 6, 2016 (FR) ...................... 16 56462

(51) Int. Cl.
*H04N 5/00* (2011.01)
*G06T 7/00* (2017.01)
(Continued)

(52) U.S. Cl.
CPC ....... *G01N 21/9054* (2013.01); *G01B 11/303* (2013.01); *G06T 7/0004* (2013.01);
(Continued)

(58) Field of Classification Search
CPC ..... G06T 7/50; G06T 7/0004; H04N 5/23238; H04N 5/2256; G01B 11/303;
(Continued)

(56) References Cited

U.S. PATENT DOCUMENTS

| 878,705 | A | 2/1908 | Adams |
| 3,390,569 | A | 7/1968 | McMeekin |

(Continued)

FOREIGN PATENT DOCUMENTS

| CN | 1050768 | 4/1991 |
| CN | 1154469 | 7/1997 |

(Continued)

*Primary Examiner* — Zhihan Zhou
(74) *Attorney, Agent, or Firm* — Clark & Brody LP

(57) ABSTRACT

An inspection device which is compatible with in-line inspection of containers and reliably determines the presence or not of a defect of a container, has a lighting system arranged above an installation zone and being capable of providing an incident light beam, an image sensor connected to an image-analysis unit, and an optical system with a first primary reflection surface arranged above the installation zone and interposed between the installation zone and the sensor for forming on the sensor an image of a container ring surface to be inspected. Also included is a second primary reflection surface in the upstream field of vision of the sensor to reflect light beams, directly or indirectly in the direction of the sensor. The first and second primary reflection surfaces determine first and second portions of a downstream field of vision, which overlap in the inspection zone.

17 Claims, 9 Drawing Sheets

(51) Int. Cl.
   *G01N 21/90* (2006.01)
   *G01B 11/30* (2006.01)
   *H04N 5/225* (2006.01)
   *H04N 5/232* (2006.01)
   *G01N 21/88* (2006.01)
   *G06T 7/50* (2017.01)

(52) U.S. Cl.
   CPC ....... *H04N 5/2256* (2013.01); *H04N 5/23238* (2013.01); *G01N 2021/8887* (2013.01); *G01N 2201/102* (2013.01); *G06T 7/50* (2017.01)

(58) Field of Classification Search
   CPC ......... G01N 21/9054; G01N 2201/102; G01N 2021/8887
   See application file for complete search history.

(56) References Cited

U.S. PATENT DOCUMENTS

| | | | |
|---|---|---|---|
| 4,284,353 A | | 8/1981 | Yoshida et al. |
| 4,606,435 A | | 8/1986 | Johnson |
| 4,758,084 A | * | 7/1988 | Tokumi ............. G01N 21/9054 250/223 B |
| 4,811,251 A | | 3/1989 | Minato |
| 4,914,286 A | | 4/1990 | Chirovsky et al. |
| 4,914,289 A | * | 4/1990 | Nguyen ............. G01N 21/8806 250/223 B |
| 4,959,538 A | * | 9/1990 | Swart ................ G01N 21/9054 250/223 B |
| 5,072,107 A | | 12/1991 | Apter |
| 5,661,294 A | * | 8/1997 | Buchmann ......... G01N 21/9054 250/223 B |
| 5,699,152 A | * | 12/1997 | Fedor ................ G01N 21/909 356/240.1 |
| 5,912,776 A | | 6/1999 | Yaginuma |
| 6,049,389 A | | 4/2000 | Volay et al. |
| 6,072,575 A | | 6/2000 | Loll |
| 6,172,748 B1 | | 1/2001 | Sones et al. |
| 6,256,095 B1 | | 7/2001 | Ringlien |
| 6,654,116 B1 | | 11/2003 | Kwirandt |
| 6,903,814 B1 | | 6/2005 | Juvinall et al. |
| 7,522,277 B2 | | 4/2009 | Lehn et al. |
| 2001/0048524 A1 | | 12/2001 | Sones |
| 2004/0150815 A1 | | 8/2004 | Sones et al. |
| 2004/0263620 A1 | | 12/2004 | Diehr |
| 2006/0051086 A1 | | 3/2006 | Schroter et al. |
| 2006/0140470 A1 | | 6/2006 | Watanabe |
| 2006/0176474 A1 | | 8/2006 | Lehn et al. |
| 2008/0094617 A1 | | 4/2008 | Diehr |
| 2008/0186693 A1 | | 8/2008 | White et al. |
| 2009/0066944 A1 | * | 3/2009 | Gauffre ............. G01N 21/9054 356/240.1 |
| 2010/0211846 A1 | | 8/2010 | Mutsumoto et al. |
| 2012/0147366 A1 | | 6/2012 | Niedermeier |
| 2014/0174127 A1 | | 6/2014 | Dalstra |
| 2016/0059343 A1 | | 3/2016 | Nam et al. |

FOREIGN PATENT DOCUMENTS

| | | |
|---|---|---|
| CN | 1312464 | 9/2001 |
| CN | 102132148 | 7/2011 |
| CN | 202649134 | 1/2013 |
| CN | 202649136 | 1/2013 |
| CN | 105492862 | 4/2016 |
| DE | 2 916 361 | 11/1980 |
| DE | 20 2012 104 043 | 11/2012 |
| EP | 0 047 936 | 3/1982 |
| EP | 1 079 228 | 2/2001 |
| FR | 2 846 422 | 4/2004 |
| FR | 2 884 611 | 10/2006 |
| FR | 2 896 041 | 7/2007 |
| JP | 63-72552 | 5/1988 |
| JP | 2009-150767 | 7/2009 |
| WO | 90/04773 | 5/1990 |
| WO | 2008/050067 | 5/2008 |
| WO | 2008/129650 | 10/2008 |
| WO | 2016/059343 | 4/2016 |

* cited by examiner

PROCESS, DEVICE AND LINE OF INSPECTION FOR DETERMINATION OF A WIRE-EDGE AT THE SITE OF AN INTERNAL EDGE OF A RING SURFACE This application is a Divisional of U.S. Ser. No. 16/314,687 filed on Jan. 2, 2019, which is a national phase of PCT/FR2017/051808 filed on Jul. 3, 2017.

The invention relates to the field of inspection of containers, especially made of glass, and more precisely the inspection of the ring surface of such containers to detect the presence thereon of any wire-edge at the site of an internal edge of the ring surface.

FIGS. 1A to 1C illustrate in section by a radial plane only the upper part of the neck of a container 14, which has a ring 12. One half only of the section is illustrated. A container 14 is defined as a hollow container defining an internal volume which is closed over its entire volumic periphery except in the region of an upper ring 12 open at one end.

For convenience, and only by way of arbitrary definition, it will in fact be considered that the container 14 comprises a theoretical central axis A1, defined as being the theoretical central axis of its ring 12. It will also be considered arbitrarily that the ring is arranged at the upper end of the container. Therefore, in the present text, the notions of top, base, upper and lower have a relative value corresponding to the orientation of the device according to the invention and of the container 14 such as illustrated in the figures. However, it is understood that the invention could be executed with indifferent absolute orientation in space, to the extent where the different components remain arranged with the same relative arrangement.

The ring 12 of the container is cylindrical in revolution around the axis A1. The body of the container, not shown, can be also a volume of revolution or not. The ring 12 is connected by its lower end (not shown) to the neck of the container, while its other free end, so-called upper by arbitrary choice within the scope of the present description, terminates in a ring surface 16.

The ring surface 16 is the upper surface or the upper ridge of the ring 12 of the container, in the case of a bottle the ring being the bulging upper part of the neck of the container. Of a form of revolution around the theoretical central axis of the ring 12, especially of circular, annular or partially toroidal form, the ring surface 16 is more or less extended according to a direction radial to the theoretical central axis A1. In theory, this surface is flat in a plane perpendicular to the theoretical central axis, in the sense that it has at least one continuous line of contact over 360° around the axis with this plane, and it is perfectly circular. While being plane in the sense above, its radial profile, i.e. in cross-section via a radial plane containing the theoretical central axis, can have forms: the profile can be different flat, rounded, in an inverted V, etc.

In the example illustrated in FIG. 1A, the ring surface 16 exhibits a domed radial, convex profile, between an internal edge 15 and an external edge 17. The internal edge 15 will be considered as being at the intersection of the ring surface 16 and of an internal surface 13 of the ring of the container, whereof the general orientation is close to that of the axis A1 of the container 14.

Of the defects to be found on a ring surface, the invention aims to detect the defects of "wire-edge" type which, if present, are located at the site of the internal edge 15 of the ring surface 16. These defects of wire-edge type are also called "overpress". A wire-edge is in the form of a defect of the radial profile of the ring surface in cross-section via a radial plane, this defect being located at the site of the internal edge 15 of the ring surface 16. In general, such a defect of wire-edge type is not occasional, therefore is not contained in a single radial plane, but extends over an arc of a circle around the theoretical axis A1 of the ring surface 16, generally over at least 1° degree of angle around this axis.

A defect of burr type is characterized by abnormal height according to the direction of the theoretical axis of the ring surface. This height can be appreciated relative to the height, according to the direction of the theoretical axis of the ring surface, of a circular line which is the intersection of the ring surface 16 with a reference plane perpendicular to the theoretical axis A1 of the ring surface. The plane PRef of FIG. 1A which is perpendicular to the theoretical axis A1 and which contains a particular point Sref of the ring surface 16 can be defined as such a reference plane. This particular point can be for example the highest point of the ring surface 16 according to the direction of the theoretical axis A1. Alternatively, this particular point can be a point at which the ring surface presents a normal forming a predetermined angle relative to the direction of the theoretical central axis.

FIGS. 1B and 1C illustrate two examples of ring surface 16, which present, in the region of the internal edge 15 of the ring surface, a defect of wire-edge type. In both cases it is clear that this defect results in the formation, at the site of the internal edge 15, of a localised peak of material which is framed radially towards the outside by a depression in the profile of the ring surface, and radially towards the inside by the internal surface 13 of the ring 12. It is generally admitted that a defect of wire-edge type extends according to an arc of a circle around the theoretical axis A1. In the examples illustrated, the defect can be characterized by an apex point, or an apex line S which represents the upper end of the wire-edge according to the direction of the theoretical axis A1. In a radial plane, a characteristic height of a defect of wire-edge type can be defined by pointing out in this radial plane the distance dZ between the apex point S and a reference plane, for example the plane Pref such as defined above, equating to the difference in height according to the direction of the theoretical axis A1 between the particular point Sref of the ring surface and the apex point S of the wire-edge.

In the example of FIG. 1B, the apex point S of the wire-edge is located beneath the reference plane Pref. In the example illustrated in FIG. 1C, the apex point S of the wire-edge is located above the reference plane Pref.

Various processes and devices have already been proposed for inspecting containers to determine the presence or not of a defect of wire-edge type such as defined hereinabove.

Document U.S. Pat. No. 4,811,251 and document WO-2008/129650 describe a process for detection of wire-edge. In these devices and these processes, the ring surface is analysed according to a radial plane, and it is necessary to have the container turned 360° to conduct complete analysis of the surface. A lighting system comprises a central light source which locally illuminates the ring surface according to a direction which moves away from the axis in the region of the incidence of rays on the ring surface. The use of such a device requires a relatively long inspection time since it needs successive shots as the container to be inspected is driven in rotation around its axis, the axis of the container staying immobile relative to the inspection device.

Also, such a device which imposes rotation of the container around its axis is not really utilisable for line inspection of containers when the latter are scrolling past, for example in a line of inspection, manufacturing, transport, processing or packaging. In fact, this restriction imposes the introduction of the container to a control station or inspection station, its setting in rotation, control during more than one revolution, stopping of the rotation, extraction from the station and return to line. Also, the handling machines necessary for introducing and extracting the container from the control station have high acquisition and running costs. Document U.S. Pat. No. 0,878,705 describes another of these inspection devices which requires rotation of the container.

Document FR-2.884.611 proposes using several cameras, each camera observing a particular angular sector of the ring. The lighting is produced by a light source in revolution centred on the axis. This solution has the disadvantage of using several expensive image sensors, and provides no information on detection of wire-edges. Also, the different cameras each deliver a partial image only of the ring surface.

This is why most systems preferably comprise a single camera of optical axis centred on the theoretical central axis of the rings, creating a direct bidimensional image of the ring surface. All these systems in translation allow high-speed inspection by way of acquisition of a single image on articles in translation at a high rate, the speeds of travel capable of reaching 1 m/s.

Document US-2001-048524 presents a solution in which the lighting is dedicated to revealing defects of wire on ring type, by means of tangential lighting. It is not adapted to viewing of wire-edges. Document US-2004-150815 presents a lighting solution in which low-angle directive lighting is added to diffuse dome lighting, and dedicated to revealing wire-edges.

Document FR-2.846.422 proposes combining several lighting systems dedicated to observation of different defects on the ring surface. The camera couleur is centred on the optical axis. One of the lighting systems, centripetal and low-angle, illuminates the ring with the aim of revealing internal wire-edges.

Despite these efforts, these high-rate inspection systems are not suitable for differentiating wire-edges as a function of their characteristic height, or for distinguishing them from an internal edge presenting a live ridge but shiny under the proposed lighting.

Also, there appears to be a need to distinguish small wire-edges to ensure a higher quality without making the error of confusing them with reflections produced by other elements of the container, for example by ridges marked of the ring or by filets present on the ring. None of the above systems is capable of providing this discrimination.

In the wider field of machines and inspection processes of containers, designed for identification of other types of defects, especially defects made on an external cylindrical surface of the ring, optical systems have already been proposed, especially annular conical mirrors, which observe the ring according to a peripheral observation field which observe the ring according to radial observation rays contained in radial planes containing the theoretical central axis A1, which are distributed at 360° around the theoretical central axis, the observation field presenting an observation elevation angle determined relative to a plane perpendicular to the axis of the ring. Such devices are for example described in documents EP-0.047.936, U.S. Pat. Nos. 4,758, 084, 4,959,538, 5,661,294, EP-0.873.510, EP-1.606.579, WO2016059343, U.S. Pat. Nos. 5,699,152, 4,914,286 or US-2009/066944.

Document WO-2008/050067 describes a device for observing a zone to be inspected of a container from several viewing angles so as to detect defects reflecting light in a preferred direction, which therefore can often be observed in a single direction of observation only.

The aim of the invention therefore is to propose an inspection device and process which are compatible with in-line inspection of containers, therefore high-rate, and which reliably determines the presence or not of a defect of wire-edge type at the site of the internal edge of the ring surface.

With this goal, the invention proposes a determination process of the presence of a glass wire-edge at the site of an internal edge of a ring surface of a ring of a container, the ring surface having as theoretical geometry a surface of revolution around a theoretical central axis, of the type comprising:

lighting of the ring surface of the container from above, by means of an incident light beam comprising radial incident light beams contained in at least one radial plane containing the theoretical central axis, said radial incident beams moving away from the theoretical central axis in the region of their incidence on the ring surface, and some of the radial beams of the incident light beam being reflected by specular reflection on the ring surface, in the form of reflected rays;

formation, with the reflected rays, of at least one image of the ring surface of the container, on a photoelectric sensor.

This process can be characterized in that:

the incident light beam comprises radial incident light beams contained in radial planes distributed at 360° around the theoretical central axis;

the process comprises observation of the ring surface, including the internal edge of the ring surface, from above, by an optical system, according to a first peripheral observation field which observes the ring surface according to first radial observation rays which are contained in radial planes containing the theoretical central axis, which are distributed at 360° around the theoretical central axis, the first peripheral observation field having a first observation elevation angle relative to a plane perpendicular to the theoretical central axis, so as to collect on a bidimensional photoelectric sensor, in a first annular zone of the sensor, to form a first bidimensional digital image zone:

some of the incident light beams reflected according to the first peripheral observation field by the ring surface, forming in said first annular image zone, a principal circle;

and optionally rays reflected according to the first peripheral observation field by the internal edge of the ring surface or by a wire-edge at the site of the internal edge, forming in said first image zone at least one secondary arc of a circle concentric to the so-called principal circle and offset radially relative to the latter;

and in that the process comprises:

search, in said first image zone, for the so-called principal circle;

search, in said first image zone, for any secondary arc of a circle concentric to the so-called principal circle and offset radially relative to the latter.

According to other optional characteristics of the invention, taken singly or in combination:

According to the first peripheral observation field having the first observation elevation angle, when parasite rays appear, reflected by a portion of a wall of the ring distinct from the ring surface and its internal edge which form parasite images in the first image zone, the observation elevation angle can be modified into a different value.

The observation elevation angle can be modified by replacing at least one component of the optical system.

The process can comprise the observation of the ring surface, as well as of the internal edge of the ring surface, from above, by an optical system, according to a second peripheral observation field which observes the ring according to second radial observation rays which are contained in radial planes containing the theoretical central axis, which are distributed at 360° around the theoretical central axis, the second peripheral observation field having a second observation elevation angle relative to a plane perpendicular to the theoretical central axis, but different to the first observation elevation angle, so as to collect on the same bidimensional photoelectric sensor, in a second annular zone of the sensor, to form a second bidimensional digital image zone:
- some of the incident light beams reflected according to the second peripheral observation field by the ring surface forming, in said second image zone, a principal circle,
- and optionally rays reflected according to the second peripheral observation field by the internal edge of the ring surface or by a wire-edge at the site of the internal edge, forming in said second image zone at least one secondary arc of a circle, concentric to the principal circle, and offset radially relative to the latter;

and the process can comprise:
- search, in said second image zone, of the principal circle,
- search, in said second image zone, of any secondary arc of a circle concentric to the principal circle and offset radially relative to the latter.

The process can comprise:
simultaneous observation by the optical system of the first peripheral observation field having the first angle of observation and of the second peripheral observation field having the second angle of observation;
adjustment by relative translation according to the theoretical central axis of a position relative of the optical system relative to the ring surface of the container, so as to allow formation of a bidimensional image of the ring surface of the container and of its internal edge either in the first image zone corresponding to the observation according to the first peripheral observation field or in the second image zone corresponding to the observation according to the second peripheral observation field,
and search of a principal circle then at least one secondary arc of a circle, either in the first image zone or in the second image zone.

The process can comprise:
simultaneous observation of the ring surface, including the internal edge of the ring surface, by the optical system, according to the first peripheral observation field and according to the second peripheral observation field;
simultaneous formation, from reflected rays collected according to the first and second peripheral observation fields, by means of the optical system, of a bidimensional image of the ring surface of the container and of its internal edge simultaneously at the same time in the first image zone corresponding to the observation according to the angle of observation and in the second image zone corresponding to the observation according to the angle of observation, on the same bidimensional sensor, the first image zone and the second image zone being disjointed.

The process can comprise:
selection, for at least one series of containers of same type, of a preferred image zone from the first and the second image zone;
search, for said series of containers, in the preferred image zone, of the corresponding principal continuous circle and the secondary arc of a circle.

The process can comprise the search, for at least one container, in the first image zone, of a first principal continuous circle and of a first secondary arc of a circle corresponding to this so-called container, and in the second image zone of a second principal continuous circle and of a second secondary arc of a circle corresponding to said container.

The process can comprise the search, for each container of at least one series of containers of same type, in the first image zone of a first principal continuous circle and of a first secondary arc of a circle corresponding to a so-called container, and in the second image zone of a second principal continuous circle and of a second secondary arc of a circle corresponding to this so-called container.

The optical system can comprise a first primary reflection surface, the first primary reflection surface being a surface of revolution centred on the theoretical central axis and arranged to reflect light beams, directly or indirectly in the direction of the sensor, coming from the ring surface according to the first peripheral observation field.

The optical system can comprise a second primary reflection surface, the second primary reflection surface being a surface of revolution centred on the theoretical central axis and arranged to reflect light beams, directly or indirectly in the direction of the sensor, coming from the ring surface according to the second peripheral observation field.

Formation of the bidimensional image zone can include the optical formation of a complete and continuous bidimensional image at 360° around the theoretical central axis of the ring surface on the same sensor.

The process can comprise determination of the presence of a wire-edge when a radial gap distance, between a secondary arc of a circle and the closest principal circle, exceeds a threshold value exceeds for at least one ray.

The process can comprise:
determination of a radial gap distance between a secondary arc of a circle and the closest principal circle; and
determination of the presence of a wire-edge when said radial gap distance exceeds a threshold value for at least one ray.

The process can comprise:
search in the first image zone, of a first principal circle and of a first secondary arc of a circle and the determination of a radial gap distance between the two;
search, in the second image zone, of a second principal circle and of a second secondary arc of a circle, and the determination of a radial gap distance between the two;
matching of the first and of the second secondary arc of a circle found respectively in the first and the second image zone as being the two images according to the first and second peripheral observation field of a same wire-edge;

determination by combination of radial gap distances measured for said first and second arcs of a circle secondary in the two image zones so as to determine a value dependent on a relative height of the wire-edge relative to the ring surface;

determination of the presence of a wire-edge when the value exceeds for at least one portion of an arc a threshold value.

The invention also propose an inspection device of the presence of a glass wire-edge at the site of an internal edge of a ring surface of a container, the ring surface having as theoretical geometry a surface of revolution around a theoretical central axis, of the type in which the device has an installation zone of a ring surface of a container to be inspected, this installation zone having an axis of installation, of the type comprising:

a lighting system arranged above the installation zone and capable of providing an incident light beam comprising radial beams contained in at least one radial plane containing the axis of installation, said radial incident beams moving away from the axis of installation in the region of their incidence on the ring surface, an image sensor connected to an image-analysis unit;

an optical system arranged above the installation zone, interposed between the installation zone and the sensor, and capable of forming on the sensor an image of the ring surface to be inspected placed in the installation zone.

Such a device can be characterized in that:

the sensor is a dimensional image sensor;

the incident light beam is a beam comprising radial incident light beams contained in radial planes containing the axis of installation and distributed at 360° around the axis of installation;

the optical system comprises at least one first primary reflection surface in an upstream field of vision of the sensor, the first primary reflection surface being a surface of revolution centred on the axis of installation, turned towards the axis of installation, and arranged to reflect light beams, directly or indirectly in the direction of the sensor, corning from the installation zone according to radial planes containing the axis of installation and according to a first peripheral observation field having a first observation elevation angle relative to a plane perpendicular to the central axis of installation.

Also, the device comprises at least one second primary reflection surface in the upstream field of vision of the sensor, the second primary reflection surface being a surface of revolution centred on the axis of installation, turned towards the axis of installation and arranged to reflect light beams, directly or indirectly in the direction of the sensor, coming from the installation zone according to radial planes containing the axis of installation and according to a second peripheral observation field having a second observation elevation angle relative to a plane perpendicular to the central axis of installation, said second observation angle being different to the first observation elevation angle, the first primary surface and the second primary reflection surface both being in disjointed portions of the upstream field of vision of the sensor.

Also, the first primary reflection surface and the second reflection surface determine for the sensor respectively a first portion of downstream field of vision and a second portion of downstream field of vision which overlap in the inspection zone.

According to other optional characteristics of the invention, taken singly or in combination:

The first primary reflection surface and the second primary reflection surface are truncated by different angles at the apex.

The first primary reflection surface and the second primary reflection surface are superposed and present a common circular ridge corresponding to a lower ridge of the upper surface and to an upper ridge of the lower surfaces The first primary reflection surface and the second primary reflection surface are axially offset relative to each other.

The first primary reflection surface and the second primary reflection surface are axially offset by being separated axially by a non-zero axial spacing between a lower edge of the upper surface and an upper edge of the lower surface.

The first primary reflection surface and the second primary reflection surface can be positioned so that:

considering a point of the ring surface;

considering a first followed optical path, between the relevant point and the sensor by an incident ray reflected at this relevant point of the ring surface according to the first observation elevation angle then reflected in the direction of the sensor on the first primary reflection surface; and considering a second followed optical path, between the relevant point and the sensor by a second incident ray reflected at this relevant point of the ring surface according to the second observation elevation angle and reflected in the direction of the sensor on the second primary reflection surface;

the difference in length between the first optical path and the second optical path is less than the depth of field value of the image formed when the optical system is developed on the ring surface.

The first primary reflection surface and the second primary reflection surface can be, according to a radial intersecting plane containing the central axis of installation, tangential to an ellipsoid whereof a focus is at the centre of the entry pupil of a lens system of a camera comprising the image sensor and whereof the second focus is arranged on the central axis of installation, in the region of the ring of the container to be inspected.

The primary reflection surface is flared according to the direction of the axis of installation and has a large diameter and a small diameter both greater than the maximal diameter of the ring surface to be inspected.

The primary reflection surface can be a truncated surface, turned towards the axis of installation.

The primary reflection surface can indirectly reflect light beams in the direction of the sensor, and between the primary reflection surface and the sensor the device can comprise at least one return reflection surface.

The return reflection surface can comprise a surface of revolution oriented opposite the axis of installation so as to send the rays back in the direction of the sensor.

Between the sensor and the primary reflection surface, the optical system can be telecentric.

The incident peripheral beam can comprise, in the same radial plane, non-parallel radial beams.

The lighting system can comprise a central light source at least in part contained in an envelope cylindrical in revolution having as axis the axis of installation and as diameter the diameter of the internal edge of the ring surface to be inspected.

The device can comprise an annular light source in revolution, centred on the axis of installation, which generates radial incident light beams which impact the ring surface after having intersected the axis of installation between the source and the ring surface.

The device can comprise a support supporting the sensor, the lens system, a primary reflection surface, a light source and optionally a return reflection surface.

The invention also relates to an inspection line of containers presenting a ring surface, of the type in which containers are moved on a conveying line by a conveyor which transports the containers according to a horizontal displacement direction perpendicular to a theoretical central axis of the containers 14 which present their ring surface in a horizontal plane turned upwards, characterized in that the installation comprises a device having at least one of the characteristics hereinabove, which is arranged on the installation with its axis of installation in a vertical position such that the observation field and the incident light beam are oriented downwards, towards the installation zone which is located between the device and a transport member of the conveyor.

In such an inspection line the conveyor can guide the containers so that their theoretical central axis coincides with the axis of installation, and, at the time of this coincidence, an image can be acquired by way of the device without contact from the device with the container.

Various other characteristics will emerge from the description given hereinbelow in reference to the appended drawings which show by way of non-limiting examples embodiments of the object of the invention.

Inspection of the ring surface according to the process of the invention will therefore essentially consist of viewing, and could optionally at least for some variants, quantify, a position deviation, according to the direction of the theoretical central axis A1 and according to the radial direction relative to this axis A1, between a principal circle representative of the ring surface and a secondary arc of a circle representative of an apex line of any defect which would be present at the site of the internal edge of the ring surface.

For a container 14 to be inspected correctly, it will have to be ensured that the container is presented adequately before an inspection device 10, whereof several variant embodiments are illustrated in FIGS. 2 to 10.

Figure 1A:
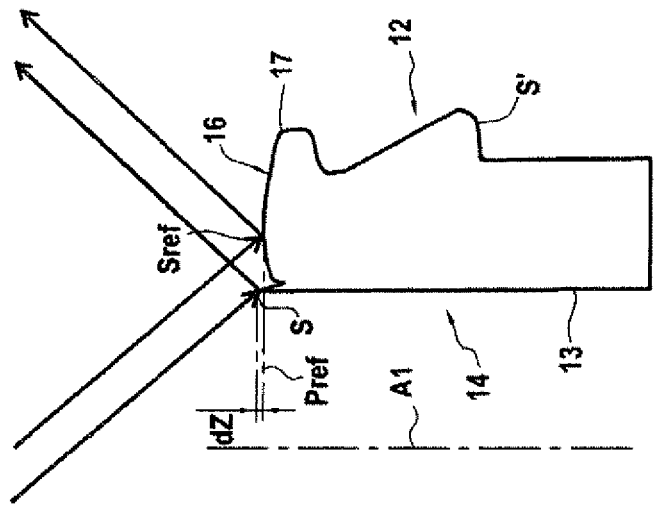
FIGS. 1A, 1B and 1C illustrate in cross-section via a radial plane only the upper part of the neck of a container which presents a ring. Half only of the section is illustrated.
Figure 1B:
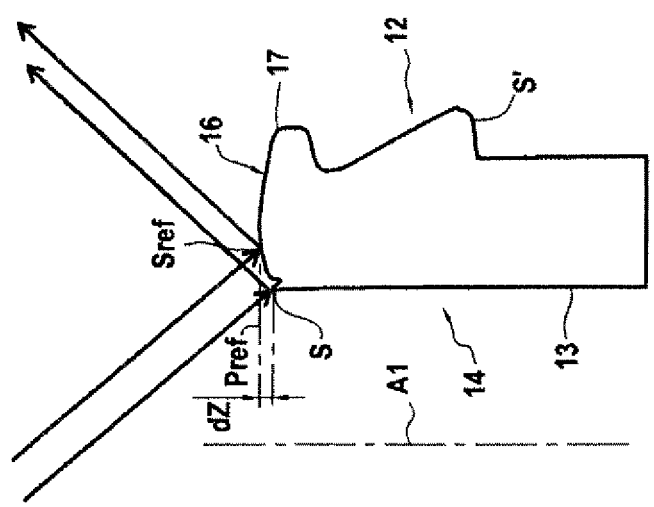
Figure 1C:
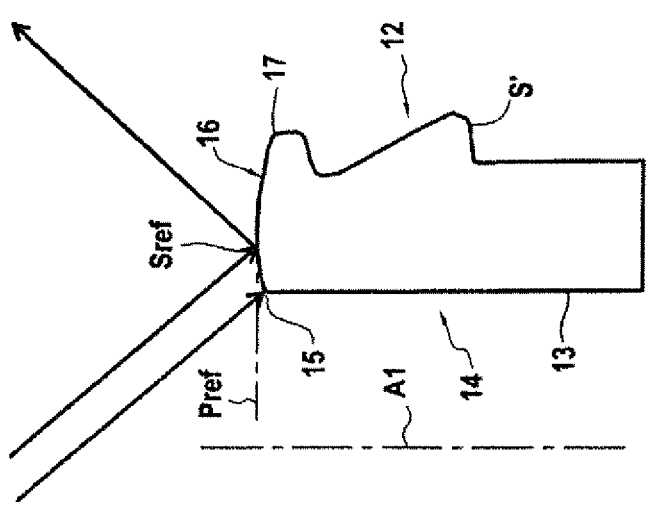
Figure 2:
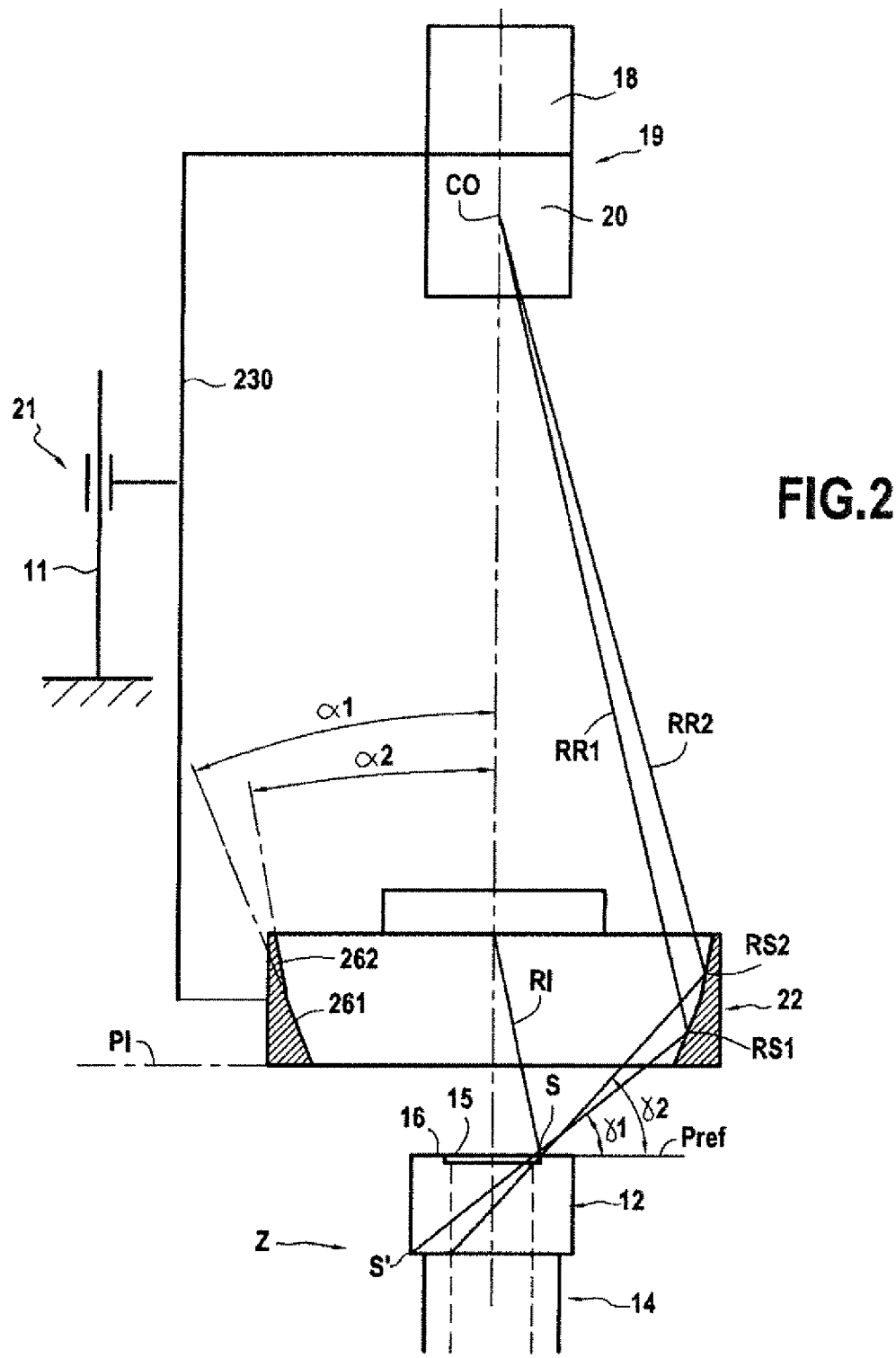
FIG. 2 is a schematic axial sectional view of an inspection device in keeping with the ideas of the invention, illustrating the optical trajectory of two observation rays between the container and an observation camera.
Figure 10:
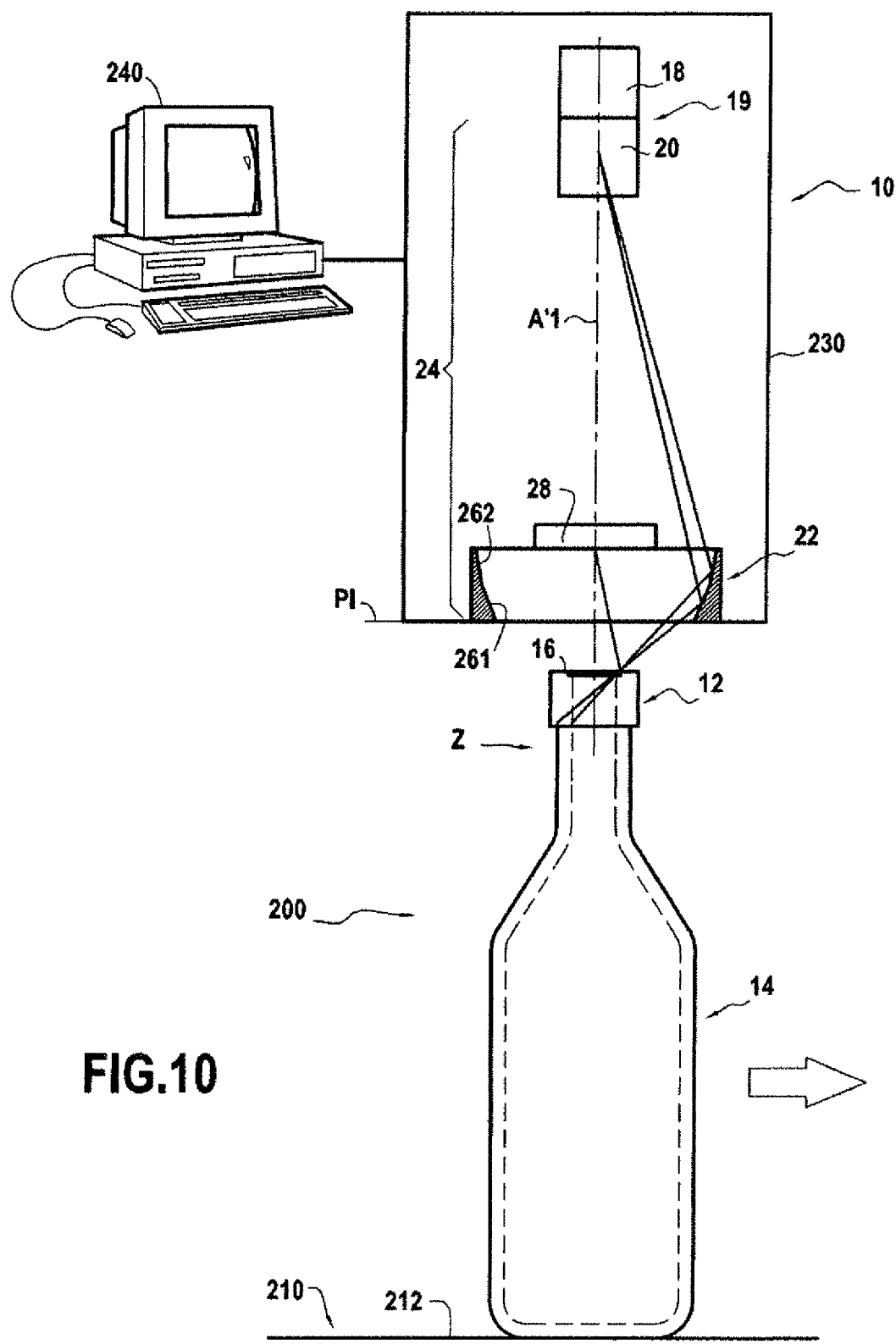
FIG. 10 illustrates an inspection line of containers implementing a device and/or a process according to the invention.

For this, as can be seen for example in FIGS. 2 and 10, a device 10 according to the invention determines an installation zone Z in which the container is to be installed. This installation zone can be defined by an axis of installation A'1 and a plane of installation PI defined as being a plane perpendicular to the axis of installation A'1 located in the region of the point the plus bas of the device. Therefore, to be inspected correctly, a container is to be presented such that its theoretical central axis A1 best corresponds to the axis of installation A'1, and that its ring is presented with its open upper end turned in the direction of the device 10, but below the plane of installation. In an ideal case, the two axes A1 and A'1 are combined. It is understood that the entire inspection device 10 according to the invention can be positioned above the plane of installation while the container will be guided below the plane of installation, without risk of contact with the device. The container 14 could therefore be guided by any translation movement according to a direction perpendicular to the axis of installation A'1, without risk of interfering with the device 10.

The device and the process according to the invention employ a bidimensional sensor 18 intended to acquire a bidimensional image of the ring surface 16 of the container. This sensor, also qualified as matricial, can be incorporated into a camera 19 and it can be photoelectric, for example of CCD or CMOS type. The sensor 18 is for example constituted by a bidimensional matrix of photoelectric elements. The sensor is generally connected to an electronic circuit for processing signals supplied by the photoelectric elements to deliver an analog or digital signal representative of the image received by the sensor. This signal representative of the optical image received by the sensor preferably constitutes a bidimensional electronic image which can then be delivered to an image-analysis unit comprising an image-digitizing device. With the rise in digital cameras integrating the digitizing function of the images, preferably this signal representative of the optical image received by the sensor constitutes a bidimensional digital image which can then be delivered to an image-processing device and/or to an inspection device and/or to an image-storing device (not shown) forming an image-analysis unit.

The sensor 18 is generally connected to an optical lens system 20 which can comprise one or more associated optical elements, especially one or more lenses, and optionally a diaphragm, to allow formation of an optical image on the sensor. The lens system optical 20 and the sensor 18 generally form part of the camera 19.

In some embodiments of the invention, the optical lens system 20 connected to the sensor 18 can be a telecentric lens system. A telecentric lens system is well known to the skilled person of industrial vision devices as it is used to form on the sensor an image which includes no or almost no parallax effect. In optical theory, a telecentric lens system is a lens system whereof the entry pupil is positioned infinitely. It eventuates that such a lens observes in its field of vision according to parallel or near-parallel principal rays of observation, resulting in the absence of a parallax effect. The principal rays of observation are those which pass through the centre of the entry pupil of the lens system 20. However, the lens system is not necessarily telecentric, as is illustrated in the figures.

The sensor 18 generally has a rectangular or square form, therefore bidimensional, such that it delivers a bidimensional digital image representative of the bidimensional optical image formed on the sensor by the optical system 20. The entire digital image delivered by the sensor 18 will be called overall image 1G. It will be seen later that in this overall digital image only one or more image zones will be useful. Preferably, the overall image IG is acquired during a single acquisition time of the sensor.

The optical axis of the lens system 20 is preferably combined with the axis of installation A1. It could however be imagined that this optical axis is not rectilinear, but segmented, for example by integration of a return mirror in the lens system. In this way a return mirror can be provided at 45° relative to the axis of installation, with a first segment of the optical axis, sensor side, which would be arranged at 90° relative to the axis of installation, and a second segment, on the other side of the return mirror, which would be arranged in line with the axis of installation A1.

In the illustrations of FIGS. 2 to 10, the optical system is arranged vertically according to the axis A1, and it is turned downwards to observe the installation zone below the device, and accordingly to observe any container 14 arranged in the installation zone. The photoelectric sensor 18 is therefore at the apex of the inspection device and it is turned downwards in the direction of the installation zone. With this arrangement, it is understood that the ring surface 16 of a container 14 placed in the installation zone is therefore contained in a plane parallel to the plane of the sensor.

Also, according to the invention, an optical system 24 is interposed between the installation zone Z of the container and the sensor 18 to form on the sensor an image of the ring surface of such a container placed in the installation zone. In addition to the optical lens system 20, this optical system 24 comprises at least one optical element of peripheral vision 22 which is here arranged between the lens system 20 and the installation zone. All the optical system 24 between the sensor 18 and the installation zone Z comprises the lens system 20 and the optical element of peripheral vision 22.

As is practical, the axis of installation A'1 will be defined as being the extension in the installation zone of the optical axis of the optical system 24.

In the example illustrated, the sensor 18, its lens system 20, the optical element of peripheral vision 22 and the installation zone are aligned in this order according to the same axis of installation A1.

Via the optical system 24, at least one plane image of the ring surface is formed on the sensor by means of an optical geometric transformation which converts the ring surface into a ring surface image. Preferably, the optical geometric transformation does not affect the relative angular positioning of two points of the ring surface around the axis, in the sense where in the image obtained by the optical geometric transformation two points of the real ring surface, separated by an angular deviation around the theoretical central axis, see their respective images separated by the same angular deviation around the image of the theoretical central axis.

Advantageously, the optical system 24 allows optical formation of a complete and continuous bidimensional image at 360° around the theoretical central axis A1 of the ring surface 16 on the same sensor 18.

In the examples illustrated, the optical element of peripheral vision 22 which ensures the essential aspect of this transoptical formation comprises at least one first primary reflection surface 261 and optionally, as in the particular embodiments which will be described hereinbelow, a second primary reflection surface 262. The first primary reflection surface 261 and optionally the second primary reflection surface 262 are arranged in an upstream field of vision of the sensor 18, that is, in the field of vision of the sensor which is between both the sensor 18 and also the first primary reflection surface 261 and the second primary reflection surface 262. In the example illustrated, the upstream field of vision of the sensor 18 is defined by the lens system 20.

The first primary reflection surface 261 is a surface of revolution centred on the axis of installation Ail and arranged to reflect light beams, coming from the ring surface, in the direction of the sensor. The primary reflection surface 261 therefore has specular properties. It can be advantageously formed by a mirror, but it can be also made in the form of a prism, i.e. an optical diopter. The second primary reflection surface 262 advantageously has the same characteristics. The first primary reflection surface and the second primary reflection surface are advantageously offset axially according to the direction of the axis of installation Ail relative to each other, that is, they are not arranged axially at the same level.

The axis of symmetry in revolution of the primary reflection surface 261 can in this case be considered as superposed to the axis of installation A'1.

In the embodiments illustrated, the reflection of light beams coming from the ring surface towards the sensor is a direct reflection, without any other reflection surface.

In the examples illustrated, the first primary reflection surface 261 is a surface of revolution which is turned towards the axis of installation A'1. In the example illustrated, it widens out in the direction of the sensor. More precisely, the first primary reflection surface 261 comprises a truncated concave surface presenting a small diameter and a large diameter, both bigger than the diameter of the ring surface of the container to be inspected. Son large diameter is arranged to the side of the sensor according to the axis of installation, while its small diameter is arranged to the side of the installation zone. The second primary reflection surface 262 advantageously has the same characteristics. In this case, the first primary reflection surface 261 and the second primary reflection surface 262 are truncated by different angles at the apex.

In the examples comprising two primary reflection surfaces, the first primary reflection surface 261 and the second primary reflection surface 262 are advantageously offset axially by being superposed axially, that is, directly attached to each other according to the direction of the axis of installation. Arbitrarily, it is considered that the primary reflection surface which is below the other according to the direction of the axis of installation Ail is the first primary reflection surface 261, the second primary reflection surface 262 being arranged above the first. As in the examples illustrated comprising two primary reflection surfaces, the two primary reflection surfaces can exhibit a common circular ridge corresponding to the lower edge of the upper surface, here the second primary reflection surface 262, and to the upper edge of the lower surface, here the first primary reflection surface 261. However, the first primary reflection surface 261 and the second primary reflection surface 262 could be offset axially by being separated axially by non-zero axial spacing between the lower edge of the upper surface and the upper edge of the lower surface.

In a device of the invention, the optical system 24 defines at least one first peripheral observation field which observes the ring surface from above, according to radial observation rays contained in a radial plane containing the axis of installation, Relative to the axis A1 of the ring surface, this observation occurs radially from the outside, relative to the ring surface. The radial observation rays are distributed at 360° around the axis of installation A'1. Relative to a plane PRef perpendicular to the axis of installation A'1, the first peripheral observation field has a first observation elevation angle γ1, which is for example between 20° and 70°. In the example illustrated, the first peripheral observation field comprises the observation rays which are reflected by the first primary reflection surface 261 towards the sensor 18. In other terms this first peripheral observation field constitutes a first downstream portion CAV1 of the field of vision of the sensor 18 via the optical system 24, such as determined by the first primary reflection surface 261, between this first surface 261 and the installation zone Z. In the portion of observation rays, which is between this first primary reflection surface 261 and the installation zone Z, the observation rays are centripetal towards the axis A1 coming from the first surface 261 towards the installation zone Z.

In the embodiments comprising the second primary reflection surface 262, the optical system 24 defines, by means of this second primary reflection surface, a second peripheral observation field which observes the ring surface from above, according to radial observation rays contained in a radial plane containing the axis of installation. Relative to the axis A1 of the ring surface, this observation occurs radially from the outside to the ring surface. The radial observation rays are distributed at 360° around the axis of installation A1. Relative to a plane PRef perpendicular to the axis of installation A'1, the second peripheral observation field has a second observation elevation angle γ2, which is for example between 20° and 70°, this second angle being different to the first observation elevation angle γ1. Preferably, the first and the second observation elevation angle differ by at least 5 degrees of angle. In the example illustrated the first peripheral observation field comprises the observation rays which are reflected on the second primary reflection surface 262. This second peripheral observation field constitutes a second downstream portion CAV2 of the field of vision of the sensor 18 via the optical system, such as determined by the second primary reflection surface 262, between this second surface 262 and the installation zone Z. In the portion of observation rays, which is between this second primary reflection surface 262 and the installation zone Z, the observation rays are centripetal towards the axis A1 coming from the first surface 261 towards the installation zone Z. It is clear that the first primary surface 261 and the second primary reflection surface 262 are each in disjointed portions of the upstream field of vision of the sensor, in the sense that they can be viewed simultaneously by the sensor via the lens system 20, without being masked from each other. To the extent where one would mask the other partially, for the one which is partially masked, only the non-masked part will be considered useful.

Preferably, the first and/or the second peripheral observation field is without azimuthal break around the axis of installation A'1. Especially, there is no angular discontinuity azimuthal between two radial observation beams infinitely close angularly around the axis of installation. In this way, there is no point break seen in the image generated by the relevant field, which could make the image more difficult to interpret. For this, the first and/or the second reflection surface 261, 262 is preferably without discontinuity of curvature around the axis of installation A'1, the curvature being analysed in a plane perpendicular to the axis of installation A'1, to ensure an observation field without azimuthal break.

The first and/or the second peripheral observation field is also preferably continuous in azimuth in the sense where no azimuthal observation angle around the axis of installation is masked. However, in some cases, especially due to hardware installation restrictions, by the presence of a supply cable, it can be that one or more angular sectors, around the axis of installation, is masked. Preferably, such a masked sector angular azimuthal will be of minimal extent or even very minimal, preferably fewer than 5 degrees around the axis of installation. For this, the first and/or second reflection surface 26 is also preferably continuous in azimuth in the sense that it is continually reflecting around the axis of installation A'1, without masked angular sector, to ensure the azimuthal continuity of the observation field.

The first and/or the second peripheral observation field extends at 360° around the axis of installation A1. The first and/or the second peripheral observation field observed "from above" in the sense that the ring surface is observed from above a plane Pref perpendicular to the theoretical central axis A1 of the ring surface, and containing at least one point of the ring surface, for example the highest point Sref according to the direction of the theoretical central axis A1. For a given peripheral observation field the observation rays are the rays coming from the installation zone and likely to be received, after reflection on the corresponding primary reflection surface 261, 262, by the sensor via the optical system 24. Of these rays, the principal observation rays are those which, after reflection on the corresponding primary reflection surface 261, 262, pass through the centre of the entry pupil CO of the lens system 20. The observation elevation angle of a principal observation ray corresponds to the angle relative to a plane perpendicular to the axis of installation A'1 of a principal observation ray in the installation zone where it is likely to impact the ring surface of a container to be inspected.

In terms of a device provided with a telecentric optical system, the principal observation rays received by the sensor all enter the lens system in parallel. If more, as in the systems illustrated, the primary reflection surface 261, 262 is a truncated surface generated by a straight line, the observation elevation angle γ1, γ2 of the corresponding peripheral observation field is a unique angle for any principal observation ray belonging to this given peripheral observation field, and it can be directly deduced from the inclination of the corresponding primary reflection surface 261, 262 relative to the axis of installation A1.

However, in the case of a device not having a telecentric lens system, or in the event where the optical element 22 would not strictly be a cone generated by a straight line, the observation rays received by the sensor, including the principal rays, can have different observation elevation angles relative to each other within a peripheral observation field determined by a given primary reflection surface. In this case as illustrated in FIG. 2, it can be taken as an example that the observation elevation angle of a peripheral observation field is the angle, measured in the installation zone where it is likely to impact the ring surface of a container to be inspected, relative to a plane perpendicular to the axis of installation A'1, of a radial observation ray which, after reflection on the corresponding primary reflection surface 261, 262, at mid-height of the latter, is directed towards the centre of the entry pupil CO of the lens system 20.

The first and/or the second primary reflection surface could be no longer truncated but a surface of revolution with double curvature, flared, generated by the revolution, around the axis of installation A'1, of a section of curve not straight, for example a section of parabola, hyperbole or ellipse. In a radial plane, this surface will present for example a concave or convex profile, while retaining its concave profile in a plane perpendicular to the axis of installation A'1. Such a surface with double curvature can be used especially to make the system 24 in its totality telecentric relative to the sensor, if the lens system 20 per se is not, so that the peripheral observation field determined by the corresponding primary reflection surface comprises principal observation rays all having the same observation elevation angle.

In a process according to the invention, here via the optical system 24, a bidimensional optical image of the ring surface is formed on the sensor by means of optical geometric transformation which converts the ring surface into an image of ring surface. The same transformation converts a wire-edge into an optical image of the wire-edge on the sensor. These two bidimensional optical images are converted into a digital image, respectively of the ring surface and of the wire-edge, by means of the sensor, optionally by means of more than one digitizing electronic circuit if the latter is not integrated into the sensor. In the event where the two primary reflection surfaces 261, 262 hereinabove are present, two bidimensional optical images of the ring surface are formed on the sensor in two annular zones of the sensor and two bidimensional optical images of the wire-edge on the sensor. These optical images are converted into two digital images of the ring surface CP1, CP2 and into two digital images of the wire-edge CS1, CS2 by means of the sensor. In practice, the optical image formed on the sensor can be combined with the digital image delivered by the sensor, optionally by means of more than one electronic digitizing circuit if the latter is not integrated into the sensor.

With respect to FIG. 18 for example, a relevant point Sref of the ring surface and the corresponding point S of the wire-edge which is the point of this wire-edge which would have the same angular coordinate as the relevant point Sref in a system of cylindrical coordinates centred on the theoretical central axis are considered. With respect to FIG. 8, it is considered that the point image ISref1 or ISref2 of the image of the ring surface is the image of the point Sref of the ring surface via the optical system (optionally the two images ISref1 and ISref2 in case of the presence of the two primary reflection surfaces such as described hereinabove), due to the optical geometric transformation. The point image IS1 or IS2 of the image of the wire-edge is the image of the corresponding point S of the wire-edge via the optical system (optionally the two images IS1 and IS2 in case of the presence of both primary reflection surfaces such as described hereinabove), due to the optical geometric transformation.

Preferably, the optical geometric transformation performed by the optical system converts a real difference in height dZ, according to the direction of the theoretical central axis, between the relevant point Sref of the ring surface and the corresponding point S of the wire-edge, into an additional image radial offset, on the image, of the point image ISref1, Isref2 of the image of ring surface of the container relative to the corresponding point image IS1, IS2 of the ring surface wire-edge. This additional image radial offset is now added to a radial offset resulting from the real radial offset between the point Sref and the corresponding point S.

In the bidimensional image collected by the sensor, the optical geometric transformation performed by the optical system therefore generates an additional offset radial image resulting from a real difference in height between a relevant point Sref of the ring surface and a corresponding point S of the wire-edge.

In the embodiments of the device according to the invention illustrated in FIGS. 2 to 10, comprising at least one primary reflection surface 261, 262 truncated, concave in a plane perpendicular to the axis of installation, the semi-angle at the apex α1, α2 characteristic of the concave primary reflection surface 261, 262 determines an influence ratio, on the radial offset in the image, between a difference in height and a difference in radial position between a point of the ring surface and a point of the wire-edge located in the same semi-radial plane delimited by the axis of installation. In an embodiment, provided for containers whereof the ring surface has an external diameter of less than 30 mm, the semi-angle at the apex α1 characteristic of the first concave primary reflection surface 261 is 20 degrees of angle, and creates a first peripheral observation field having an observation elevation angle γ1 of 40°, while the semi-angle at the apex α2 characteristic of the concave second primary reflection surface 262 is 13.15 degrees of angle, and creates a first peripheral observation field having an observation elevation angle γ2 of 52°.

According to another aspect of the invention, the process ensures that the ring surface 16 of the container is lit by means of an incident light beam comprising radial incident light beams contained in at least one radial plane containing the theoretical central axis A1 of the ring, said radial incident beams moving away from the theoretical central axis A1 in the region of their incidence on the ring surface, and some of the radial beams of the incident light beam being reflected by specular reflection on the ring surface 16, in the form of reflected rays. The incident light beam comprises radial incident light beams contained in radial planes distributed at 360° around the theoretical central axis A1.

The ring surface is lit from above, in the sense that incident light beams arrive at the ring surface 16 having come from points located above the plane PRef perpendicular to the theoretical central axis A1 and containing a point of the ring surface, for example the highest point according to the direction of the theoretical central axis A1.

Figure 4:
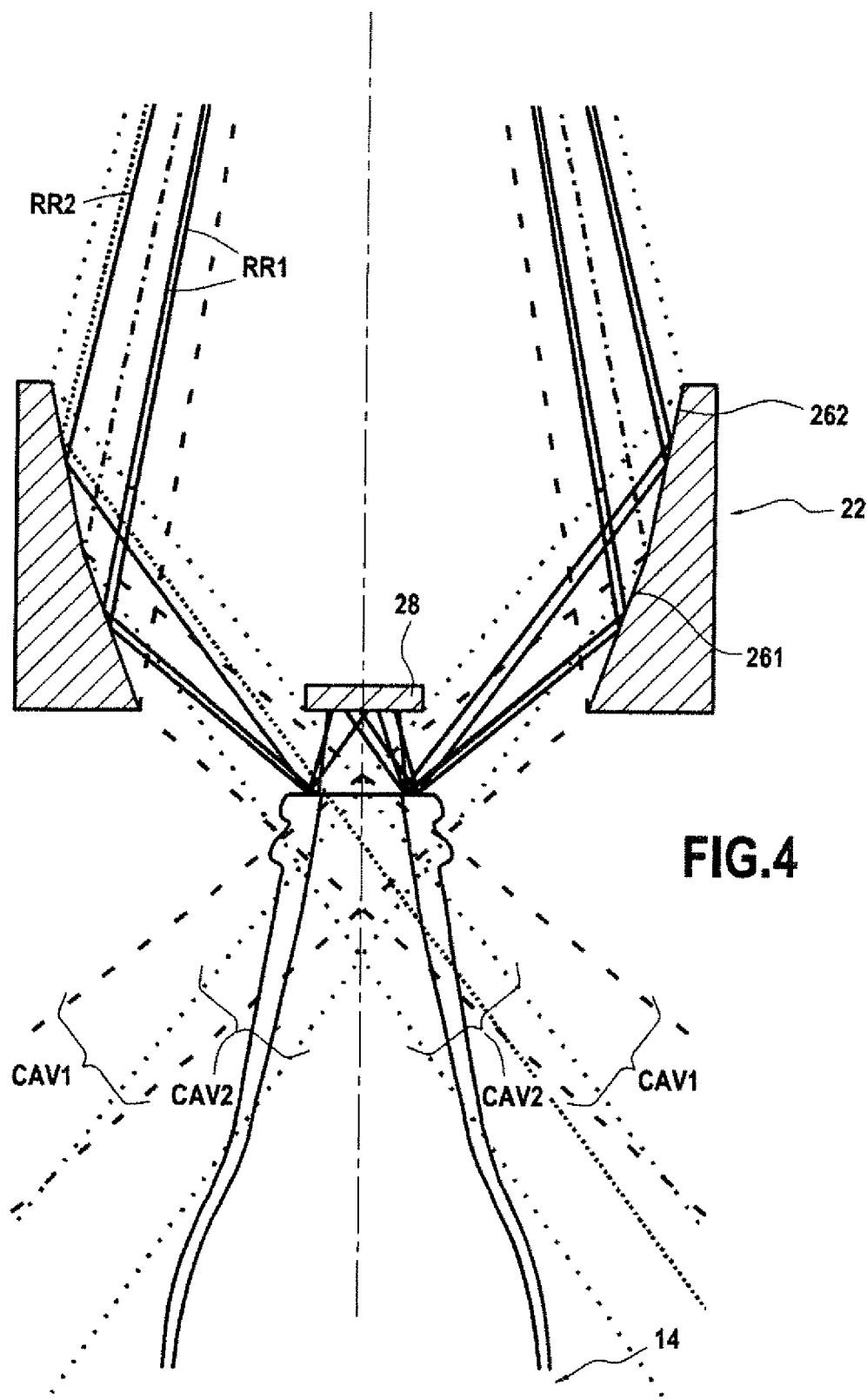
FIG. 4 is an enlarged view of a part of FIG. 3.
Figure 5:
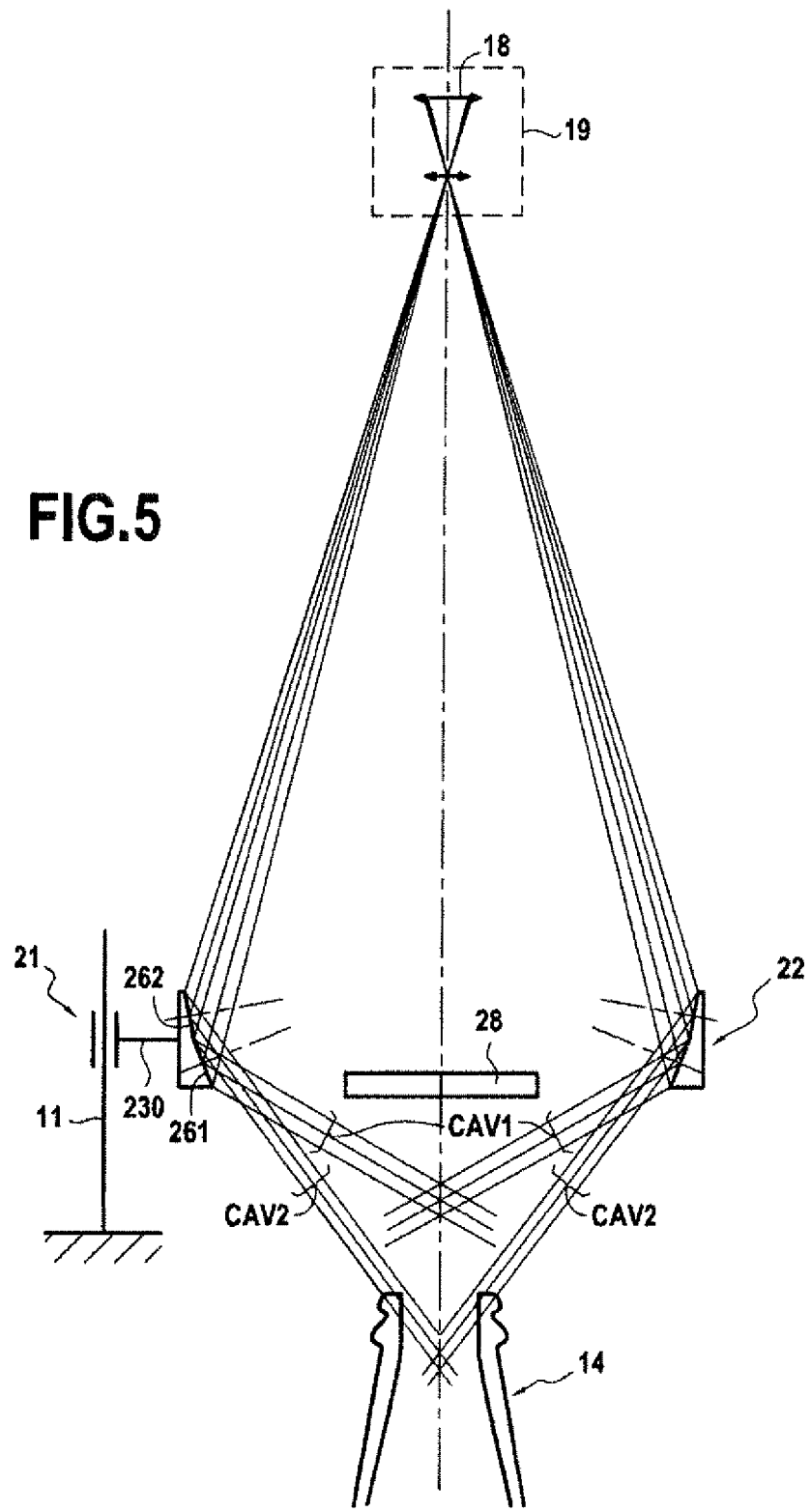
FIG. 5 is a schematic axial sectional view of an inspection device in keeping with the ideas of the invention, illustrating different portions of the field of vision of the sensor via another embodiment of a system.

The radial incident beams could be parallel rays, but this is not obligatory and, in the process illustrated by FIGS. 4 and 5, the peripheral incident light beam comprises non-parallel radial beams, in a given semi-radial plane, containing the theoretical central axis A1 and delimited by the theoretical central axis A1.

In a device according to the invention, the device comprises a lighting system capable of providing such an incident light beam.

Preferably, this lighting system comprises a light source 28 centred on the axis of installation A'1 and arranged above the installation zone, therefore above the ring surface.

In a first embodiment, illustrated in FIGS. 4 and 5 especially, the lighting system comprises a central light source 28 at least in part contained in an envelope cylindrical in revolution having as axis the axis of installation A'1 and as diameter the diameter of the internal edge 15 of the ring surface to be inspected. Such a light source can be a one-off source, centred on the axis of installation, or by comparison as illustrated especially in FIGS. 4 and 5, a source covering a specific range radially relative to the axis of installation. In some embodiments, the light source 28 covers a diameter range of less than or equal to the diameter of the ring of the container. The light source 28 can be a source diffuse, diffusing incident rays in multiple directions. For instance, the light source 28 can comprise a diffusor qui, for example, covers a surface whereof the diameter can be less than or equal to the diameter of the ring of the container. If it is fitted with a diffusor, at each point of the diffusor the light source 28 diffuses incident rays in multiple directions. Preferably, the radial range of the central light source 28 and the orientation of the incident rays it emits are selected such that the incident rays cannot impact directly an external cylindrical surface of the ring 12, located below the external edge 17, or nets supported by such an external cylindrical surface of the ring 12.

Figure 9:
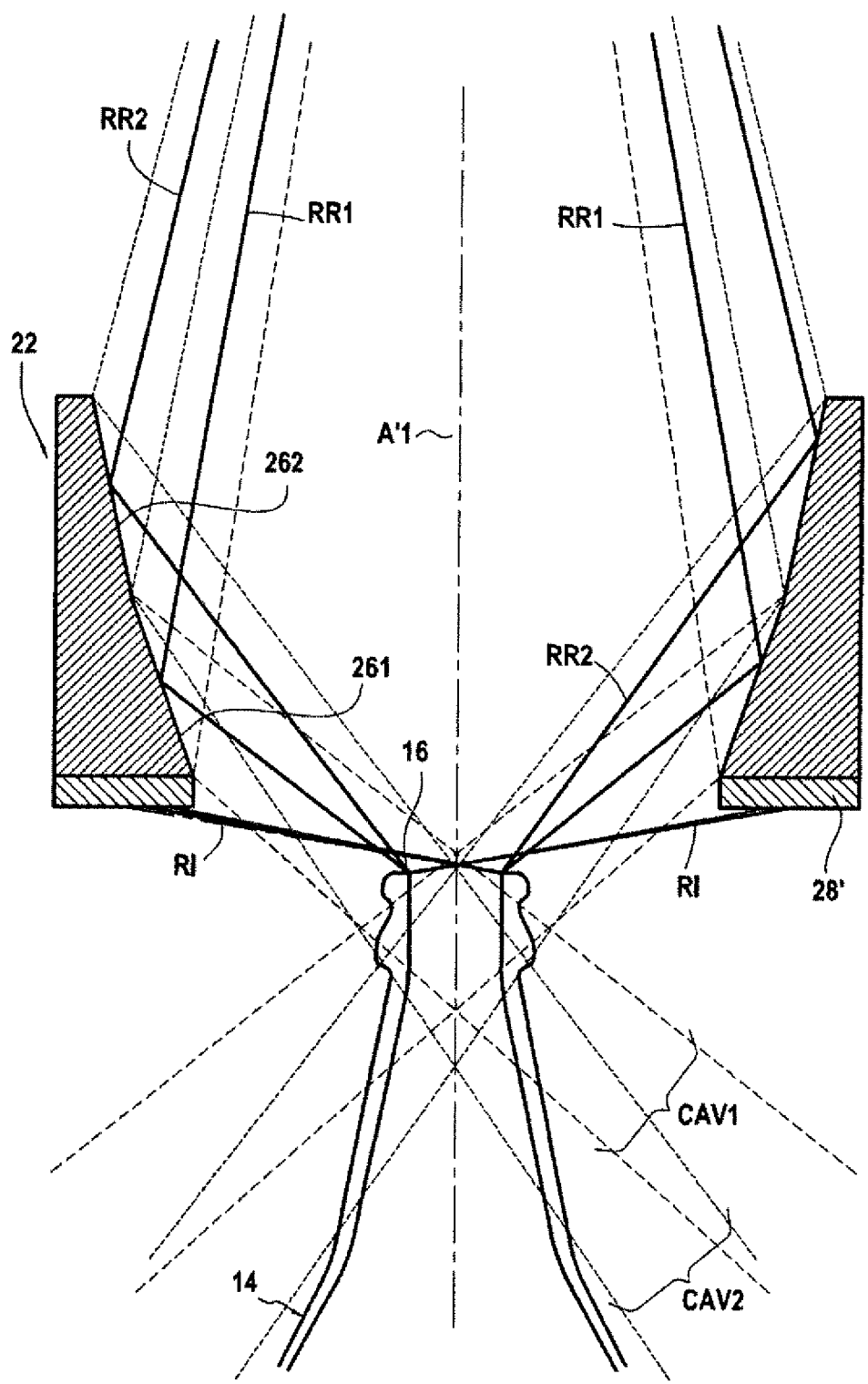
FIG. 9 illustrates a variant embodiment of the light source likely to be used with the different embodiments mentioned.

As a variant, as illustrated in FIG. 9, the device could comprise a light source 28' annular in revolution, centred on the axis of installation A1, which generates radial incident light beams which impact the installation zone after having intersected the axis of installation A'1. In this case, the annular light source can have an internal diameter greater than the diameter of the ring surface of the containers to be controlled by means of the device. In a semi-radial plane containing the axis of installation A'1 and delimited by this axis of installation, such an annular light source would correspond to a source which can be occasional, or which in contrast can have a special radial range in this semi-plane as illustrated in the figures. This light source lights in the direction of the installation zone, therefore in the direction of the axis of installation, but by forming an angle with the latter so as to light downwards. If this source is not a source emitting parallel rays, in this semi-radial plane it preferably emits a light cone containing radial beams according to a continuous or substantially continuous range. This range can for example form an angular sector extending between 0 and 40 degrees relative to a plane perpendicular to the theoretical central axis. The angular extent of the range is preferably limited by one or more caches, which can for example comprise a diaphragm, so that the incident rays may not directly impact an external cylindrical surface of the ring 12, located below the external edge 17, or nets supported by such an external cylindrical surface.

In the example of the FIG. 9, the light source 28' is annular and arranged just below the optical element of peripheral vision 22, here below the first primary reflection surface. It could also be arranged around the optical element of peripheral vision 22.

To the extent where the light source 28' is annular, it can be likened to a multitude of sources, optionally one-off or nearly one-off, arranged around the axis of installation A'1 and each emitting a range of light such as defined hereinabove. Preferably, the light source is continuous over the entire periphery at 360° around the axis of installation, in the sense that in each semi-radial plane it emits the same light range. However, in reality the light source is generally not completely continuous. It can also eventuate that it is interrupted over an angular sector, preferably limited, around the axis A'1. It can also eventuate that the light source is not continuous, in the sense that it would be formed by a series of discrete, juxtaposed individual sources, for example formed by a series of light-emitting diodes.

In general, the light source 28, 28' comprises a series of discrete, juxtaposed individual sources, for example formed by a series of light-emitting diodes, these sources individual juxtaposed being connected to a diffusor such that the light source delivers lighting which can be considered as continuous and diffuse.

The light spectrum delivered by the light source 28 can be monochromatic or polychromatic, for example extending over a range in wavelengths. The light spectrum delivered by the light source 28 preferably comprises wavelengths in the visible field.

In a preferred variant the light source 28 comprises white light-emitting diodes, whereof the spectrum emission covers the extent of the visible field.

Figure 8:
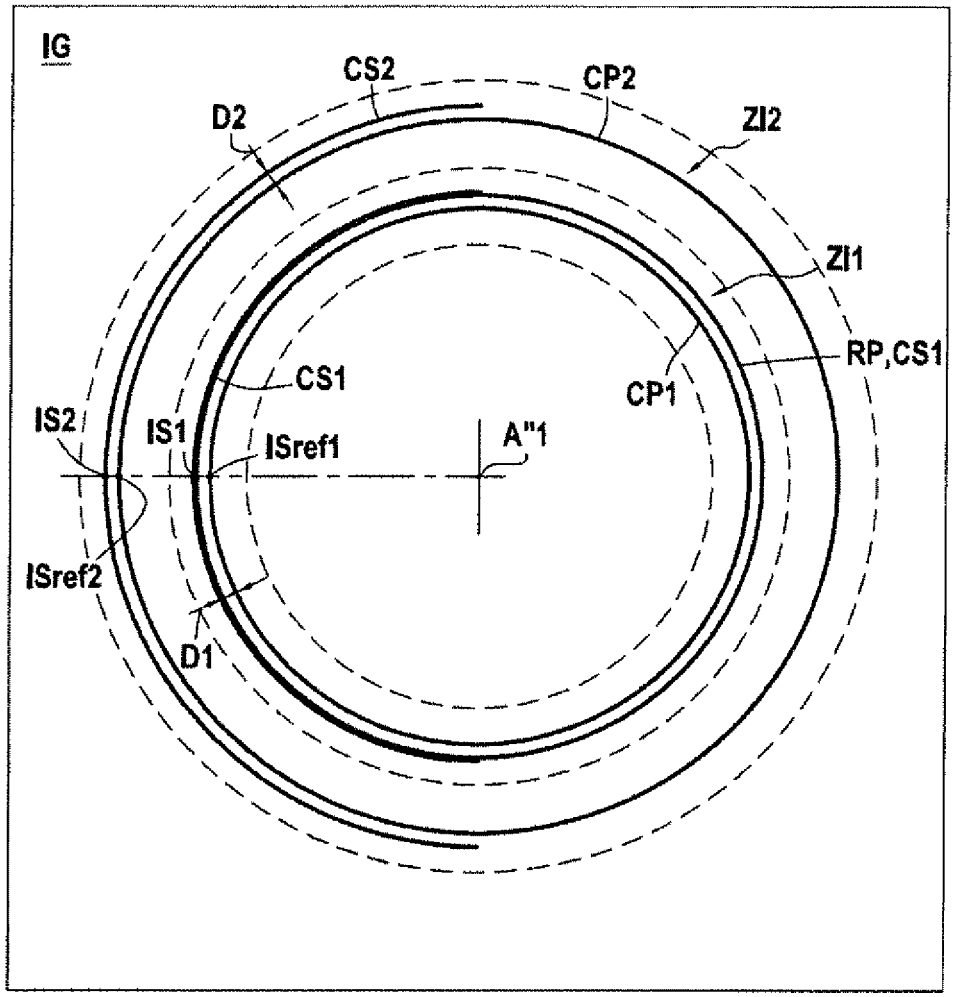
FIG. 8 is a view illustrating an image capable of being formed by the sensor of the device of FIG. 3 in the presence of a container to be inspected in the installation zone.

In the invention, with the rays reflected at least one image of the ring surface of the container is formed, on the sensor 18, as illustrated in FIG. 8.

By way of observation of the ring surface 16, including the internal edge of the ring surface, the following is collected by the optical system according to the first peripheral observation field on the bidimensional photoelectric sensor, in a first annular zone of the sensor to form a first image zone in the bidimensional digital example, ZI1:
  some of the incident light beams reflected, according to the first peripheral observation field having the observation elevation angle γ1, by the ring surface, to form in said first zone ZI1, a first principal circle CP1;
  and optionally if a wire-edge is present in the region of the internal edge, reflected rays, according to the first peripheral observation field having the first observation elevation angle γ1, by the internal edge of the ring surface or by a wire-edge at the site of the internal edge, forming in said first image zone, at least one first secondary arc of a circle CS1 concentric to the first principal circle CP1, and offset radially relative to the latter.

The first image zone ZI1 in which it can be expected to find the first principal circle CP1 and any first secondary arc of a circle CS1 is an annular zone here. As per the transoptical formation carried out by the optical system 24, the secondary circle CS1 can be radially outside the first principal circle CP1, as in the example of FIG. 8, or in contrast inside the latter.

The first principal circle CP1 corresponds to a portion of the ring surface formed by points which present a normal such that there is at least one incident ray which, by specular reflection at this point, is reflected, after reflection on the first primary reflection surface 261, according to an observation ray of the first peripheral observation field. As per the configuration of the incident light beam, especially as a function of the extent of the light source 28, of the character diffuse or not of the light source, and of the profile of the ring surface seen in section in a semi-radial plane, the thickness of the first circle CP1 will be more or less considerable. In fact, as a function of these parameters, in a given semi-radial plane there will be one or more points of the ring surface which will allow reflection of an incident ray in the direction of the sensor via the optical system 24. But, especially if the ring surface presents a domed profile, some parts of the ring surface are not visible in the image of the ring surface, for want of sending back rays reflected according to the first peripheral observation field having.

With a device such as described previously, the first principal circle CP1 is generally continuous over 360° if the ring surface has no defect other than a possible wire-edge at the site of its internal edge.

It can be taken as an example that the centre of the first principal circle CP1 determines a central axis A"1 of the image, this axis being the image of the theoretical central axis A1 of the ring surface.

To determine the presence of a wire-edge at the site of the internal edge of the ring surface, the process comprises for example:
  search, in said first image zone ZI1, for the first principal circle CP1;
  search, in said first image zone ZI1, for any secondary arc of a circle CS1 concentric to the first principal circle CP1 and offset radially relative to the latter.

However, in the example illustrated in FIG. 8 it is evident that the first zone image ZI1 presents two complete concentric circles at 360°, while the observed container presents a wire-edge which extends over approximately half of a circle only. This phenomenon is explained as follows.

FIG. 2 illustrates an incident ray RI emitted by the light source, which is reflected by an apex point S of a wire-edge located at the site of the internal edge of the ring surface in a reflected ray RR1 which is intercepted by the first primary reflection surface 261, at a point RS1 and then reflected towards the sensor by the optical system. As seen above, it is considered that the point S is the highest point locally of the profile of the wire-edge in the semi-radial plane corresponding. In practice a wire-edge almost always comprises a live ridge such that there is a point very near the highest point, to the point where they can be considered combined, capable of sending an incident ray according back to the observation elevation angle.

Between the point S of the wire-edge and the first reflection surface 261 the ray RR1 spreads according to an observation ray of the first peripheral observation field. However, if the direction of the ray RR1 is extended in its portion between its point of reflection RS1 on the first reflection surface 261 and the ring, beyond the apex point S of the wire-edge, it is clear that this direction which corresponds to an observation ray now impacts a point S' of the ring of the bottle which is likely to reflect an incident light ray according to this same observation ray. In other words, the point S' of the ring, here for example a point of the lower peripheral external edge of the ring, sometimes called "counter-ring surface" or "ring base", is likely to be reflected on the same point of reflection RS1 on the first reflection surface 261, such that the point S and the point S' will be combined in the image formed on the sensor and therefore in the digital image. In general, this reasoning applies 360° around the axis of installation. In the present case, the point S' belongs to a circular peripheral edge which extends 360° around the axis A1 such that there appears on the image a parasite reflection RP, here in the form of a circle, which is in part combined with the first secondary arc of a circle CS1. It is therefore understood, for this particular case of a container 14, that due to the particular geometry of the ring, and due to the observation elevation angle particular determined by the first reflection surface 261, the image obtained by the device cannot prove satisfactory to effectively determine the presence of a wire-edge or not.

At this stage, it is evident that this particular case in which a parasite reflection prevents proper determination of the presence of a wire-edge is one particular case only. In many cases, a device comprising a single primary reflection surface such as described hereinabove will for many containers perform altogether effective detection of the presence of a wire-edge at the site of an internal edge of the ring surface. In fact, in the absence of parasite reflections this determination will be done by comparative analysis of the first principal circle and of the first secondary arc of a circle in the same way as will be described later in relation to a second principal circle and a second secondary arc of a circle formed in a second image zone.

However, according to the first peripheral observation field having the first observation elevation angle γ1, when parasite rays appear, reflected by a portion of a wall of the ring, distinct from the ring surface 16 and distinct from its internal edge, which form parasite images in the first image zone ZI1, especially arcs of a circle similar to those produced by the internal edge or a wire-edge, it can advantageously be ensured to modify the observation elevation angle γ1 into a different observation elevation angle value γ2.

The observation elevation angle can be modified by replacing at least one component of the optical system 24, especially by replacing the first primary reflection surface. A device could be provided in which the optical element of peripheral vision 22, comprising the first primary reflection surface 261, is interchangeable with other optical elements of peripheral vision which would present a primary reflection surface determining another observation elevation angle different. However, replacement of one optical element by another is a procedure which can prove complex and which can require alignment adjustments.

This is why, in a refined variant, the invention provides observation of the ring surface 16, as well as of the internal edge of the ring surface, from above, by the optical system 24, according to a second peripheral observation field determined by the second primary reflection surface 262.

By way of this second primary reflection surface 262, the following is collected on the same bidimensional photoelectric sensor 18, in a second annular zone of the sensor to form a second bidimensional digital image zone 212:
  some of the incident light beams reflected, according to the second peripheral observation field having the second observation elevation angle γ2, by the ring surface, forming in said second image zone ZI2 a second principal circle CP2;
  and optionally rays reflected according to the second peripheral observation field having the second observation elevation angle γ2 by the internal edge 15 of the ring surface 16 or by a wire-edge at the site of the internal edge, forming in said second image zone, at least one second secondary arc of a circle CS2, concentric to the second principal circle CP2, and offset radially relative to the latter.

FIG. 2 shows that the incident ray RI is reflected by the apex point S into a second ray reflected RR2 which is intercepted by the second primary reflection surface 262, at a point RS2 and accordingly reflected towards the sensor 18 by the optical system 24. In this example, if the direction of the second ray reflected RR2 is prolonged beyond the apex point S of the wire-edge, it is clear that this direction, which corresponds to an observation ray, will impact the ring of the bottle at points which are not likely to reflect an incident light ray according to this same observation ray. Therefore, this observation ray is not affected by a parasite image. Advantageously, this is true at 360° around the axis of the installation.

Consequently, as seen in FIG. 8, by way of this modification of the observation elevation angle the second primary principal circle CP2 and the second secondary arc of a circle CS2 can be distinguished very clearly in the second image zone ZI2. The term "second" which is used here for the second principal circle and the second secondary arc of a circle derives from being found in the second image zone, corresponding to the second observation elevation angle.

The second image zone ZI2 in which it can be expected to find the second principal circle CP2 and any second secondary arc of a circle CS2 is here an annular zone. Following transoptical formation performed by the optical system 24, the second secondary arc of a circle CS2 can be located radially outside the second principal circle CP2, as in the example of FIG. 8, or in contrast inside the latter.

The second principal circle CP2 corresponds to a second image of a portion of the ring surface formed from points which present a normal such that there is at least one incident ray which, by specular reflection at this point, is reflected, after reflection on the second primary reflection surface 262, according to an observation ray of the second peripheral observation field. As for the first principal circle CP1, the thickness of the second circle CP2 will be more or less considerable, and it is generally continuous over 360° if the ring surface shows no defect other than a possible wire-edge at the site of its internal edge.

To determine the presence of a wire-edge at the site of the internal edge of the ring surface, the process comprises for example:
  search, in said second image zone Z12, of the second principal circle CP2;
  search, in said second image zone Z12, of any second secondary arc of a circle CS2 concentric to the second principal circle CP2 and offset radially relative to the latter.

In the overall digital image, the first and the second principal circle and the first and the second secondary arc of a circle can be marked by a brightness value greater than a brightness value of the background of the image.

Whether this is for the first image zone or the second image zone, it is considered that in the absence of wire-edge at the site of the internal edge the internal edge exhibits its geometry nominal. In this case, a secondary arc of a circle corresponding optionally at this internal edge will be found, or not. This will depend especially on the nominal geometry of this internal edge, as a function of which incident rays will be reflected, or not, in the direction of the primary reflection surface. If the internal edge of nominal geometry reflects incident rays in the direction of the sensor with reflection on the corresponding primary surface, it is possible that the secondary arc of a circle corresponding to the internal edge extends over 360°. If in contrast the internal edge of nominal geometry does not reflects the incident rays in the direction of the sensor, there will be no secondary arc of a circle visible in the corresponding image zone.

It is therefore understood that there is interest, to limit the case in which parasite reflections could affect the precision of determination of the presence of a defect of wire-edge type, to provide observation of the ring surface and its internal edge according to two different observation elevation angles.

Preferably, these two observation elevation angles are obtained by way of two separate primary reflection surfaces arranged simultaneously on the device and generating these two angles.

In a variant, it is ensured that these two primary reflection surfaces are arranged simultaneously on the device and, via an operation of relative displacement between the container and the optical system, an image of the ring surface and of any wire-edge can be formed either by means of the first primary reflection surface 261 or by means of the second primary reflection surface 262, but not both at the same time. This variant is illustrated especially in FIGS. 5, 6 and 7.

FIG. 5 in fact illustrates the sensor 18, the lens 20, here outlined in the form of a lens, the optical element 22 comprising the first primary reflection surface 261 and the second primary reflection surface 262, the central light source 28 and the container 14, which present the characteristics described above.

The first primary reflection surface 261 and the second primary reflection surface determine for the sensor respectively a first downstream portion of field of vision CAV1 and a second downstream portion of field of vision CAV2. The first and the second downstream portion of field of vision comprise all the points of the space of the installation zone for which an image is formed on the sensor 18 by the optical system, respectively after reflection on the first or the second primary reflection surface. In cross-section via a plane perpendicular to the axis of installation, these downstream portions of field of vision CAV1, CAV2 are annular. From the corresponding primary reflection surface, these portions of downstream fields of vision are directed downwards, centripetal in the direction of the axis of installation so as to form an annular cone frustum having a semi-angle at the apex complementary to the observation elevation angle.

It is understood, that for an image of the ring surface 16 to be formed by reflection on one or the other of the two primary reflection surfaces, the ring surface has to be installed in the corresponding downstream portion of field of vision CAV1, CAV2.

Figure 6:
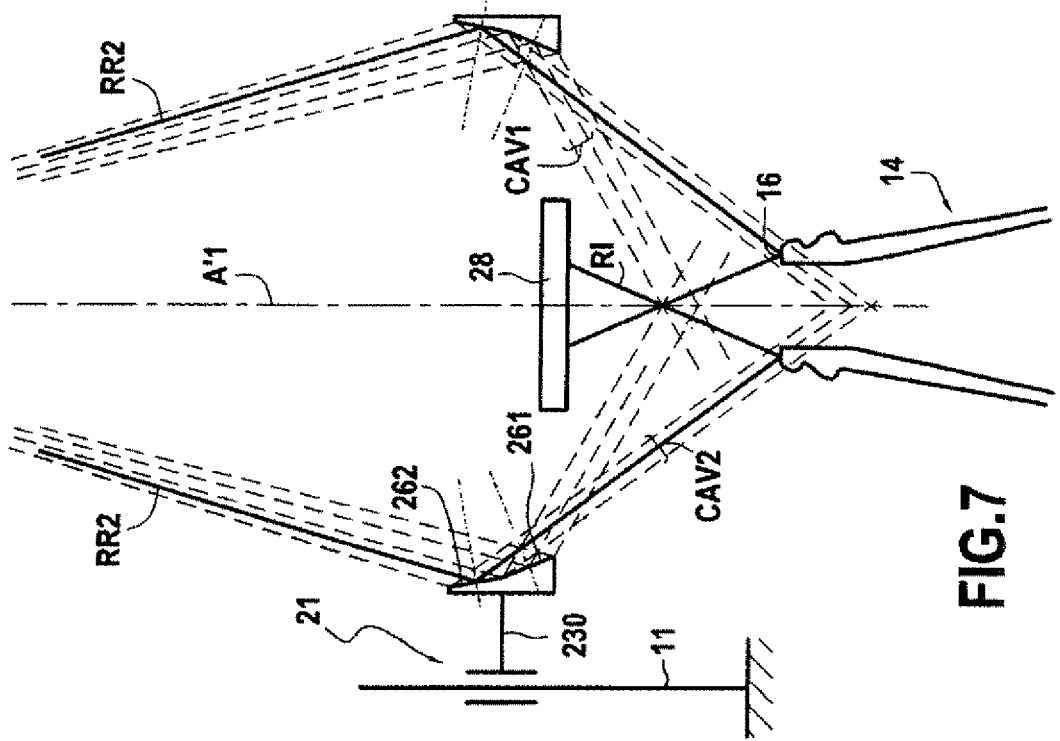
FIGS. 6 and 7 are enlarged views of a part of FIG. 5, illustrating two relative positions of a container to be inspected relative to the inspection device, to obtain two different observation angles of elevation.
Figure 7:
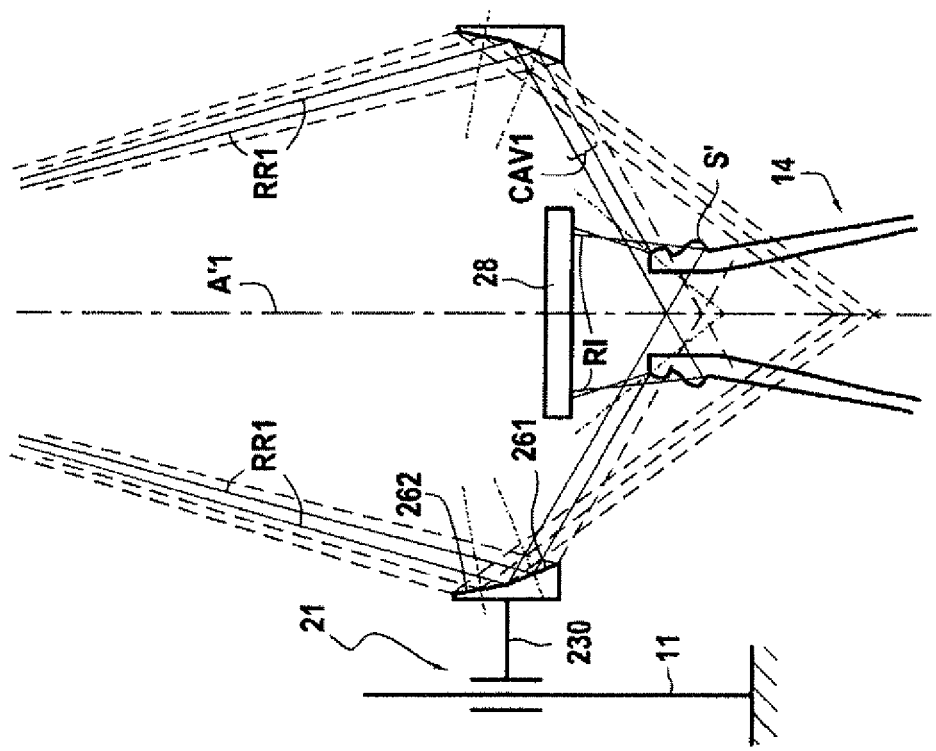

As illustrated in FIGS. 6 and 7, this embodiment is such that there is no common inspection zone in which the two downstream portions of field of vision CAV1, CAV2 would overlap and in which the ring surface could be received.

In contrast, FIG. 6 shows that the container 14 must be placed in a first axial position relative to the device 10 so that the ring surface 16 is included in the first downstream portion of field of vision CAV1 which is determined by the first primary reflection surface 261. In this position, only the first principal circle and any first secondary circle are formed in the overall image. In the example illustrated, it is evident that at least one of the observation rays of the first peripheral observation field is likely to intercept an incident ray reflected by an external surface 5' of the ring which is not the one to be detected. This is therefore a parasite reflection which will generate a parasite image in the image produced after reflection on the first primary reflection surface 261.

FIG. 7 shows that, relative to the device 10, the container 14 occupies a second axial position offset according to the direction of the axis of installation relative to the first, so that the ring surface 16 is included in the second downstream portion of field of vision CAV2, which is determined by the second primary reflection surface 262. In this second position, the same container generates no parasite reflection which would be visible according to the second peripheral observation field, which would be likely to create a parasite image. In this position, only the second principal circle and any second circle secondary are formed in the overall image.

The relative displacement of the container relative to the device can be created for example by ensuring that the device, or a part of the latter, is mounted by means of a support 230 which can be mobile, for example by means of a slide 21, on a chassis 11 occupying a fixed position relative to a device for conveying containers. By shifting the inspection device 10, or a part of the latter, along the slide the relative position of the device, and therefore of the optical system, can be adjusted by translation relative to the ring surface of a container in the installation zone. It can also be provided that the containers are conveyed by a conveying device adjustable in height in the region of an inspection station comprising the inspection device.

Such a device ensures simultaneous observation of the ring surface, by the optical system 24, according to the first peripheral observation field having the first angle of observation γ1 and according to the second peripheral observation field having the second angle of observation γ2 as the two reflection surfaces are contained in disjointed portions of the upstream field of vision of the sensor. However, with such a device adjustment must be carried out, by relative translation according to the theoretical central axis, of the relative position of the optical system relative to the ring surface of the container, so as to allow formation of a bidimensional image of the ring surface of the container and its internal edge either in the first image zone ZI1 corresponding to the observation according to the first the second peripheral observation field having the first angle of observation γ1, or in the second image zone ZI2 corresponding to the observation according to the second peripheral observation field having the second angle of observation γ2.

In this case, in a given overall digital image 1G, delivered by the sensor 18, there is a single image of the ring surface and a single image of any wire-edge, in one or the other of the two image zones.

It will be noted that relative displacement between the optical system and the ring surface is preferably achieved by retaining the relative positions of the optical system and of the elements which make it up relative to the lens system 20, the sensor 18, and the light source 28. In this case, the container 14 is shifted relative to the device 10 according to the direction of the axis of installation A1. However, as a variant, it is possible at least in some embodiments for the relative displacement between the camera 19 and the optical system and the ring surface to also involve relative displacement between the camera 19 and the optical element of peripheral vision 22 which bears the primary reflection surfaces.

In any case, based on an overall image acquired by way of such a device on the presence or not of a wire-edge could be determined by searching, in an overall image acquired by way of the sensor 18, for a principal circle and at least one secondary arc of a circle, either in the first image zone ZI1 or in the second image zone ZI2.

In such a system, it could obviously be provided, for each container, to acquire two overall images each corresponding to one of the relative positions of the container 14 of the device 10. However it is accepted that this would not be optimal. In reality, it is understood that the problems of parasite reflections which might be encountered with one or the other of the peripheral observation fields are intrinsically linked to the geometry of the container. On a line for inspection, manufacturing, conveying or packaging of containers, containers are generally all the same type, presenting the same geometry, at least for a significant time period. Also, with such a device not allowing simultaneous formation in the same overall image of an image of the ring surface and of any wire-edge according to the first peripheral observation field, and of an image of the ring surface and of any wire-edge according to the second peripheral observation field, at the start of inspection of a series of containers a predetermination step of the observation elevation angle to be used for a given type of container will preferably be conducted. This predetermination step can be conducted manually by an operator who will appreciate the possible presence of parasite reflections likely to impair inspection. For example, comparing an image taken according to the first peripheral observation field and an image taken according to the second peripheral observation field could determine which of the two images will give the most reliable inspection results. This comparison can also be done automatically, by computer analysis of these two images. Based on this analysis, one or the other of the observation elevation angles can be selected and the relative position of the device relative to the container can be adjusted at the start of inspection to keep it throughout inspection of the series of containers of identical geometries.

Figure 3:
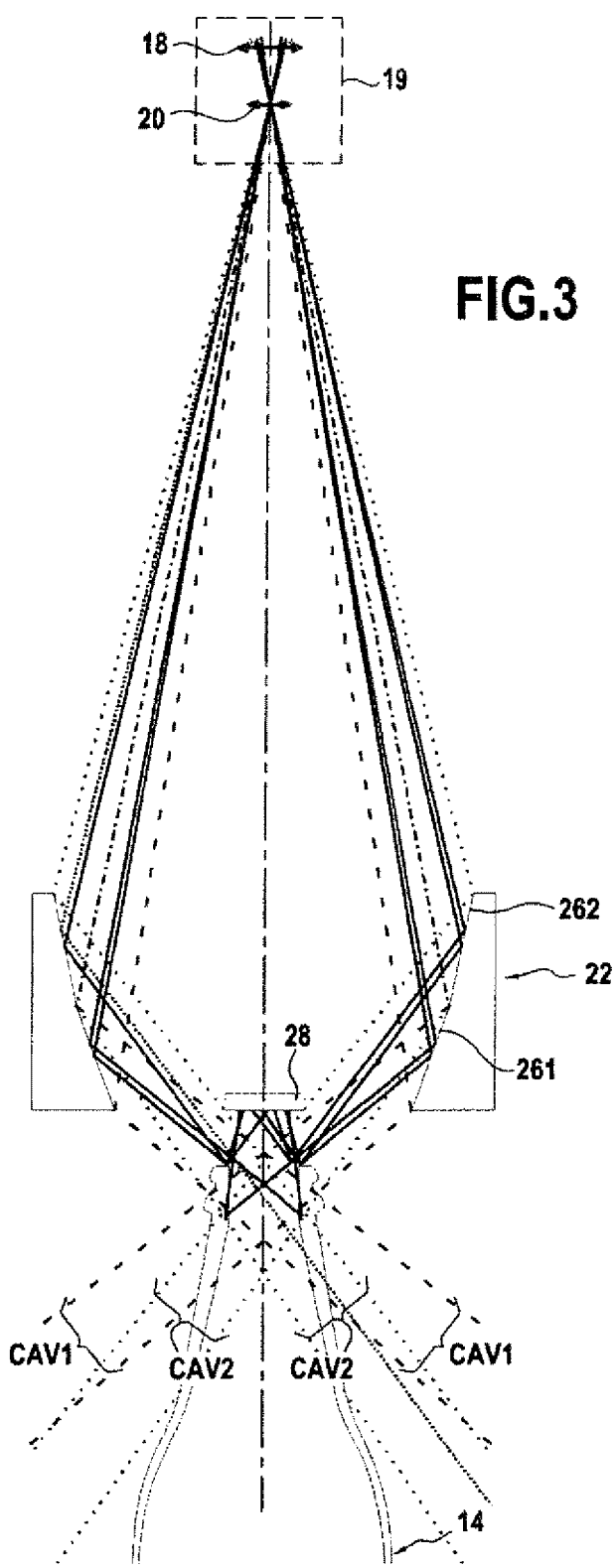
FIG. 3 is a schematic axial sectional view of an inspection device in keeping with the ideas of the invention, illustrating different portions of the field of vision of the sensor via an embodiment of a system.

However, in a preferred embodiment of the invention, as illustrated in FIG. 2, FIG. 3 and FIG. 4, the two primary reflection surfaces are selected and arranged relative to the device such that the optical system simultaneously forms two images separated in two distinct zones of the sensor on the sensor 18 so that the latter delivers an overall image comprising two distinct image zones, each distinct image zone comprising an image of the ring surface and an image of any wire-edge formed from rays collected according to the peripheral observation field having the observation elevation angle determined by the corresponding primary reflection surface.

Such an overall image is especially that illustrated in FIG. 8.

Therefore, the device of FIGS. 2, 3 and 4 enables simultaneous observation of the ring surface 16, including the internal edge of the ring surface, by the optical system 24, 124, according to the first peripheral observation field and the second peripheral observation field. Therefore, this enables simultaneous formation, from reflected rays collected according to the first and second peripheral observation fields, by means of the optical system 24 of a bidimensional image CP1, CP2 of the ring surface of the container and CS1, CS2 of its internal edge simultaneously and at the same time in the first image zone ZI1 corresponding to the observation according to the first peripheral observation field having the first angle of observation γ1 and in the second image zone Z2 corresponding to the observation according to the second peripheral observation field having the second angle of observation γ2, on the same bidimensional sensor 18, the first image zone and the second image zone being disjointed.

In this case, for each container there will therefore be an overall image comprising two image zones each comprising an image of the ring surface and of any wire-edge, from two different observation elevation angles. This overall image IG is preferably acquired during a single acquisition time of the image sensor 18.

For this, the optical element of peripheral vision 22 which comprises the first primary reflection surface and the second reflection surface is designed so that these two surfaces determine, for the sensor, respectively a first downstream portion of field of vision annular CAV1 and a second downstream portion of field of vision annular CAV2 which overlap in a common inspection zone in the installation zone. This common inspection zone is a zone of the space comprising all the points which can be received by the sensor 18 via the optical system 24 at the same time after reflection on the first primary reflection surface 261 and after reflection on the second primary reflection surface 262. The geometry of the common inspection zone must be adapted so it can receive the ring surface of a container to be inspected.

Preferably, the first primary reflection surface and the second primary reflection surface will be optimised such that the two images of the ring surface and of any wire-edge obtained both by reflection on the first primary reflection surface 261 and also by reflection on the second primary reflection surface 262 are sharp for the same adjustment for developing the device.

In particular, it will be ensured that the first primary reflection surface and the second primary reflection surface are positioned by:
  considering a point S of the ring surface 16 arranged in the inspection zone common;
  considering a first optical path RR1 followed, between the relevant point S and the sensor 18, by an incident ray RI reflected at this relevant point S of the ring surface according to the first peripheral observation field having the first observation elevation angle then reflected in the direction of the sensor on the first primary reflection surface 261; and considering a second optical path RR2 followed, between the relevant point S and the sensor 18, by an incident ray reflected at this relevant point S of the ring surface according to the second peripheral observation field having the second observation elevation angle and reflected in the direction of the sensor on the second primary reflection surface 262.

In this case, the difference in length between the first optical path and the second optical path is less than the depth of field value of the camera 19 when the optical system is developed on the ring surface.

As is known, the depth of field is shown by all the points contained between two planes perpendicular to the optical axis of the optical system for which the points are seen as sharp for given development of the optical system. The depth of field value corresponds to the distance between these two planes.

This property creates optimal sharpness in the two image zones ZI1, ZI2, with the same adjustment for developing the optical system 24.

One way of achieving this property is to ensure that the first primary reflection-surface and the second primary reflection surface, according to a radial intersecting plane containing the central axis of installation, are tangential to an ellipsoid whereof the foci are arranged on the axis of installation A'1. A first focus of the ellipsoid is arranged in the region of the centre CO of the entry pupil of the lens system 20. The second focus of the ellipsoid is arranged on the central axis of installation A'1, in the region of the ring 12 of the container to be inspected. Given the depth of field value for the optical systems used in the field of the invention, there is tolerance as to the exact position of the foci, especially according to the direction of the axis of installation.

Assuming a series of containers of identical geometries is inspected, a single one of the two images could be used after a predetermination step comprising for example selection, for at least one series of containers of the same type, of a preferred image zone of the first and the second image zone, in the same way as has been seen earlier in relation to the previous embodiment. In this case, in light of determining the presence of a wire-edge at the site of the internal edge of the corresponding container, analysis of an image can comprise search, for said series of containers, in the preferred image zone, for the corresponding principal continuous circle and of the secondary arc of a circle.

However, to the extent where for each container to be inspected there is an overall image comprising two image zones each comprising an image of the ring surface and of any wire-edge, according to two peripheral observation fields different having two different observation elevation angles, in light of determining the presence of a wire-edge at the site of the internal edge of the corresponding container, analysis of an image can comprise search, for said container, in the first zone and in the second image zone, for the first and the second principal continuous circle and the first and the second secondary arc of a circle corresponding to this so-called container. For the same container this produces information drawn from observation from two different observation elevation angles. This redundancy confirms the presence of defects. This information also determines, for example in a triangulation operation, with greater precision and confidence in information on the geometry of the wire-edge, for example its height and/or its radial position relative to the assumed site of the internal edge.

This cross-checking of information obtained from the two peripheral observation fields having different observation elevation angles can be reserved for some containers, for example containers presenting particular defect characteristics. However, this can be leveraged not only for a given container, but optionally for a whole series of containers of the same type, presenting the same geometry for example.

In light of determining the presence or not of a defect of wire-edge type for a given container, the process could comprise determination in the image of a radial gap distance between a secondary arc of a circle and the closest principal circle in an image zone obtained by way of the invention. The presence of a defect of wire-edge type could be determined when said radial gap distance exceeds a threshold value exceeded for at least one ray.

More particularly, in the embodiments in which a first image zone and a second image zone are formed, each comprising the image of the ring surface and of any wire-edge at the site of its internal edge, analysis of these image zones could comprise:

search in the first image zone for the first principal circle and a first secondary arc of a circle and determination of a first radial gap distance D1 between the two; the radial gap distance is for example, for an arc, the maximal value of the radial spacing between the two on the extent angular of the arc;

search in the second image zone for the second principal circle and a second secondary arc of a circle, and determination of a second radial gap distance D2 between the two;

matching a first and second secondary arc of a circle found respectively in the first and the second image zone as being the two images, from the first and second peripheral observation field, of a same wire-edge; such matching, or pairing, can comprise ascertaining by an algorithm that the two arcs found each in a different zone image are of the same object;

determination by combination of the radial gap distances D1 and D2 measured for said first and second arcs of a secondary circle in the two image zones ZI1, ZI2 so as to determine a value dependent on a relative height dZ of the wire-edge relative to the ring surface;

determination of the presence of a wire-edge when the value dependent on the relative height dZ exceeds a threshold value for at least one portion of an arc.

In the embodiments which have been described hereinabove, each primary reflection surface directly reflects the light beams in the direction of the sensor 18. However, as a variant, at least one return reflection surface could be provided between the primary reflection surface or surfaces 261, 262 and the sensor 18. In this case it is considered that the primary reflection surface 126 reflects the light beams indirectly in the direction of the sensor 18. Such a return reflection surface can comprise a reflecting conical or truncated convex surface, centred on the axis of installation, turned opposite the axis of installation, flared downwards and of smaller diameter than the primary reflection surface or surface.

FIG. 10 illustrates an inspection line 200 of containers 14 executing a device 10 according to the invention. In the example illustrated, containers 14 are moved by a conveyor 210 which transports the containers 14 according to a direction of travel, for example of horizontal translation perpendicular to the theoretical central axis A1 of the containers 14. In the example illustrated, the conveyor 210 comprises a conveyor belt 212 on which the containers 14 are placed by their bottom surface, also called laying plane, with their theoretical central axis A1 arranged vertically. The conveyor could comprise a conveying wheel moving the containers 14 according to a circular travel trajectory, especially in a horizontal plane. The conveyor 210 could also comprise guide means (not shown) cooperating with the lateral faces of the containers 14. The containers 14 present their ring surface 16 in a horizontal plane turned upwards. The conveyor 210 guides the containers according to the horizontal trajectory below the device 10 according to the invention, without risk of interference with the device 10. The device 10 can comprise a support, for example in the form of a case 230, incorporating especially the sensor 18, the lens system 20, a light source 28, a first primary reflection surface 261 and optionally a second primary return reflection surface 262. The housing 230 is arranged above the conveyor. Inside the housing 230, a device 10 according to the invention is arranged with its axis of installation A'1 in a vertical position, such that the observation field and the incident light beam are oriented downwards, towards the installation zone Z which is located between the lower face of the housing 230 and the conveyor belt 212. It is therefore understood that in the region of this inspection station the conveyor 210 guides the containers so that their theoretical central axis A1 best coincides with the axis of installation A'1. At the time of this coincidence, an image is acquired by way of the device 10, without this needing either handling of the container or stopping of the conveyor. The image acquired by the device 10 can then be sent to a processing system 240, for example an image-processing device and/or a viewing device and/or an image-storing device, for example a computer system comprising a computer. It is then possible to analyse the image acquired in this way and determine the presence or not of a wire-edge at the site of the internal edge of the ring surface 16 of the container 14.

The camera can be triggered to integrate an image synchronised with the displacement of items, especially to fix the image at the time of alignment of the theoretical axis of ring A1 with the axis of installation A'1. The integration time is made short, for example under 1 ms, or even 400 µs, so as to reduce the risk of blurring in the images.

The light source can be pulsed, that is, it can produce lighting over a brief time of flash type, for example less than 1 ms, or even 400 µm, so as to reduce the risk of blurring in the images.

It can be provided that the processing system 240 cooperates with, or includes, a control unit which pilots the light source and the camera so as to synchronise them with displacement of items.

The device and the process therefore have no physical contact with the container to be controlled. A device according to the invention turns out to be lighter and have less bulk than devices of the prior art, enabling especially its easy installation in a station or on an inspection line for articles, a station or inspection line which can include other devices designed for other controls, and the device according to the invention can therefore be installed especially in a production line where containers circulate by chain. Such a device allows the control of containers in line, whether on a production line for containers, or on a processing line of containers, or on a high-speed filling line.

The device and the process according to the invention can be executed with a single bidimensional photoelectric sensor, for example a single camera, and all the same give reliable information as to the presence or not of a wire-edge at the site of the internal edge of the ring surface, this from a single optical bidimensional image, acquired directly by the sensor, and not from several optical images acquired separately.

The observation system according to the invention is presented here in preferred embodiments in which the reflecting surfaces are mirrors. It is possible to obtain the same results by using optical elements of prism type, presenting likewise conical surfaces for example, causing total reflections. An optical element in terms of the invention can comprise a Fresnel lens. Such means also allow observation with the same values of the angle γ, and telecentric observations or not can be conceived by these means.

The invention is not limited to the examples described and shown as various modifications can be made thereto without departing from its scope.

The invention claimed is:

1. The inspection device of the presence of a glass wire-edge at the site of an internal edge of a ring surface (16) of a container (14), the ring surface of the container (14) being able to reflect light rays in a specular manner, the ring surface having as theoretical geometry a surface of revolution around a theoretical central axis (A1), of the type in which the device (10) has an installation zone (Z) of a ring surface (16) of a container to be inspected, this installation zone having an axis of installation (A'1), of the type comprising:

a lighting system (28, 28') arranged above the installation zone and capable of providing an incident light beam comprising radial rays contained in at least one radial plane containing the axis of installation (A'1), said radial incident rays moving away from the axis of installation (A'1) in the region of their incidence on the ring surface;

a sensor (18), connected to an image-analysis unit;

an optical system (24, 261, 262) arranged above the installation zone, interposed between the installation zone and the sensor (18), and capable of forming on the sensor (18) an image (CP1, CP2) of the ring surface (16) to be inspected (14) placed in the installation zone;

characterized in that:

the sensor is a bidimensional image sensor;

the incident light beam is a beam comprising radial incident light beams contained in radial planes containing the axis of installation (A'1) and distributed at 360° around the axis of installation (A'1);

the optical system comprises at least one first primary reflection surface (261) in an upstream field of vision of the sensor, the first primary reflection surface (261) being a surface of revolution centred on the axis of installation (A'1), turned towards the axis of installation, and arranged to reflect, directly or indirectly in the direction of the sensor (18), light rays coming from the installation zone according to radial planes containing the axis of installation (A'1) and according to a first peripheral observation field having a first observation elevation angle (γ1) relative to a plane perpendicular to the central axis of installation (A'1);

the device comprises at least one second primary reflection surface (262) in the upstream field of vision of the sensor (18), the second primary reflection surface being a surface of revolution centred on the axis of installation, turned towards the axis of installation and arranged to reflect, directly or indirectly in the direction of the sensor (18), light rays coming from the installation zone according to radial planes containing the axis of installation (A'1) and according to a second peripheral observation field having a second observation elevation angle (γ2) relative to a plane perpendicular to the central axis of installation (A'1), said second observation elevation angle being different to the first observation elevation angle, the first primary surface and the second primary reflection surface, both being in disjointed portions of the upstream field of vision of the sensor;

the first peripheral observation field and the second peripheral observation field enabling a radial observation which enables observation of the ring surface according to radial observation rays contained in a radial plane containing the axis of installation relative to the axis of the ring surface, such observations occur radially from an outside to the ring surface, and the first primary reflection surface (261) and the second reflection surface (262) determine for the sensor (18) respectively a first portion of downstream field of vision (CAV1) and a second portion of downstream field of vision (CAV2) which overlap in the inspection zone.

2. The device according to claim 1, characterized in that the first primary reflection surface (261) and the second primary reflection surface (262) are in the shape of truncated cones having different angles at the apex.

3. The device according to claim 2, characterized in that the first primary reflection surface (261) and the second primary reflection surface (262) are superposed and present a common circular ridge corresponding to a lower ridge of the upper surface and to an upper ridge of the lower surface.

4. The device according to claim 2, characterized in that the first primary reflection surface (261) and the second primary reflection surface (262) are axially offset by being separated axially by a nonzero axial spacing between a lower edge of the upper surface and an upper edge of the lower surface.

5. The device according to claim 1, characterized in that the first primary reflection surface (261) and the second primary reflection surface (262) are positioned so that:
considering a point (Sref) of the ring surface;
considering a first optical path (RR1) followed, between the relevant point (Sref) and the sensor (18), by an incident ray reflected at this relevant point of the ring surface according to the first peripheral observation field (γ1) then reflected in the direction of the sensor on the first primary reflection surface (261); and
considering a second optical path followed, between the relevant point and the sensor, by a second incident ray reflected at this relevant point of the ring surface according to the second peripheral observation field (γ2) and reflected in the direction of the sensor on the second primary reflection surface (261);
the difference in length between the first optical path and the second optical path is less than the depth of field value of the image formed when the optical system (24) is developed on the ring surface (16).

6. The device according to claim 1, characterized in that the first primary reflection surface (261) and the second primary reflection surface (262) are, according to a radial intersecting plane containing the central axis of installation (A'1), tangential to an ellipsoid whereof a focus is at the centre of the entry pupil of a lens system (20) of a camera (19) comprising the image sensor (18) and whereof the second focus is arranged on the central axis of installation (A'1), in the region of the ring (12) of the container to be inspected.

7. The device according to claim 1, characterized in that the primary reflection surface (261, 262) is flared according to the direction of the axis of installation (A'1) and has a large diameter and a small diameter both greater than the maximal diameter of the ring surface (16) to be inspected.

8. The device according to claim 1, characterized in that the primary reflection surface (261, 262) is a surface in the shape of a truncated cone, turned towards the axis of installation (A'1).

9. The device according to claim 1, characterized in that the primary reflection surface (261, 262) indirectly reflects light rays in the direction of the sensor (18), and in that the device comprises, between the primary reflection surface (261, 262) and the sensor (18), at least one return reflection surface.

10. The device according to claim 9, characterized in that the return reflection surface comprises a surface of revolution oriented opposite the axis of installation (A'1) so as to send the rays back in the direction of the sensor (18).

11. The device according to claim 1, characterized in that, between the sensor (18) and the primary reflection surface (261, 262), the optical system is telecentric (20).

12. The device according to claim 1, characterized in that the incident peripheral beam comprises, in the same radial plane, non-parallel radial rays.

13. The device according to claim 1, characterized in that the lighting system comprises a central light source (28) at least in part contained in an envelope cylindrical in revolution having as axis the axis of installation (A'1) and as diameter the diameter of the internal edge (15) of the ring surface (16) to be inspected.

14. The device according to claim 1, characterized in that it comprises a light source (28') annular in revolution, centred on the axis of installation (A'1), which generates radial incident light rays which impact the ring surface (16) after having intersected the axis of installation (A'1).

15. The device according to claim 1, characterized in that the device (10) comprises a support (230) supporting the sensor (18), the lens system (20), a primary reflection surface (261, 262), a light source (28, 28') and optionally a return reflection surface (32).

16. An inspection line (200) of containers (14) presenting a ring surface (16), of the type in which containers (14) are moved on a conveying line by a conveyor (210) which transports the containers (14) according to a horizontal displacement direction perpendicular to a theoretical central axis (A1) of the containers 14 which present their ring surface (16) in a horizontal plane turned upwards, characterized in that the installation comprises a device (10) according to claim 1, which is arranged on the installation with its axis of installation (A'1) in a vertical position, such that the observation field and the incident light beam are oriented downwards, towards the installation zone (Z) which is located between the device and a transport member of the conveyor (212).

17. The inspection line (200) according to claim 16, characterized in that the conveyor (210) guides the containers so that their theoretical central axis (A1) coincides with the axis of installation (A'1), and, at the time of this coincidence, an image is acquired by way of the device (10), without contact from the device (10) with the container (14).

* * * * *